United States Patent
Jo

(10) Patent No.: US 12,166,482 B2
(45) Date of Patent: Dec. 10, 2024

(54) GENERATING PHYSICAL UNCLONABLE FUNCTION DATA FROM A TRANSISTOR OF A SEMICONDUCTOR DEVICE

(71) Applicant: Crossbar, Inc., Santa Clara, CA (US)

(72) Inventor: Sung Hyun Jo, Sunnyvale, CA (US)

(73) Assignee: Crossbar, Inc., Santa Clara, CA (US)

( * ) Notice: Subject to any disclaimer, the term of this patent is extended or adjusted under 35 U.S.C. 154(b) by 245 days.

(21) Appl. No.: 17/956,912

(22) Filed: Sep. 30, 2022

(65) Prior Publication Data

US 2024/0113715 A1    Apr. 4, 2024

(51) Int. Cl.
*H03K 19/17768*   (2020.01)
*H03K 19/0175*    (2006.01)
*H03K 19/17784*   (2020.01)

(52) U.S. Cl.
CPC ......... *H03K 19/17768* (2013.01); *H03K 19/017545* (2013.01); *H03K 19/17784* (2013.01)

(58) Field of Classification Search
None
See application file for complete search history.

(56) References Cited

U.S. PATENT DOCUMENTS

| | | | |
|---|---|---|---|
| 11,082,242 B2 * | 8/2021 | Lu | H03K 19/0944 |
| 11,233,663 B1 * | 1/2022 | Hoefler | H04L 9/0866 |
| 11,734,459 B2 * | 8/2023 | Spalding | H04L 9/3278 |
| | | | 713/189 |
| 2018/0013431 A1 * | 1/2018 | Bury | H04L 9/0861 |

OTHER PUBLICATIONS

Wu et al., "A PUF Scheme Using Competing Oxide Rupture with Bit Error Rate Approaching Zero", 2018 IEEE International Solid-State Circuits Conference, 3 pages long, pp. 130-132.

* cited by examiner

*Primary Examiner* — Jany Richardson
(74) *Attorney, Agent, or Firm* — Wegman Hessler Valore

(57) ABSTRACT

A physical unclonable function (PUF) can be implemented on a transistor of an integrated circuit device to generate PUF data. A potential difference is supplied across a gate insulator to induce a conductive breakdown in the gate insulator material. Location of the conductive breakdown within the gate insulator and in relation to the source node and drain node can be highly unpredictable, randomly resulting in a higher gate-source current or higher gate-drain current, respectively. The gate-source or gate-drain current can be measured and digitized to generate the PUF data value from the transistor. Moreover, PUF data values generated from multiple transistors can be highly non-correlated and useful for a random data sequence for cryptographic applications and other security applications.

20 Claims, 15 Drawing Sheets

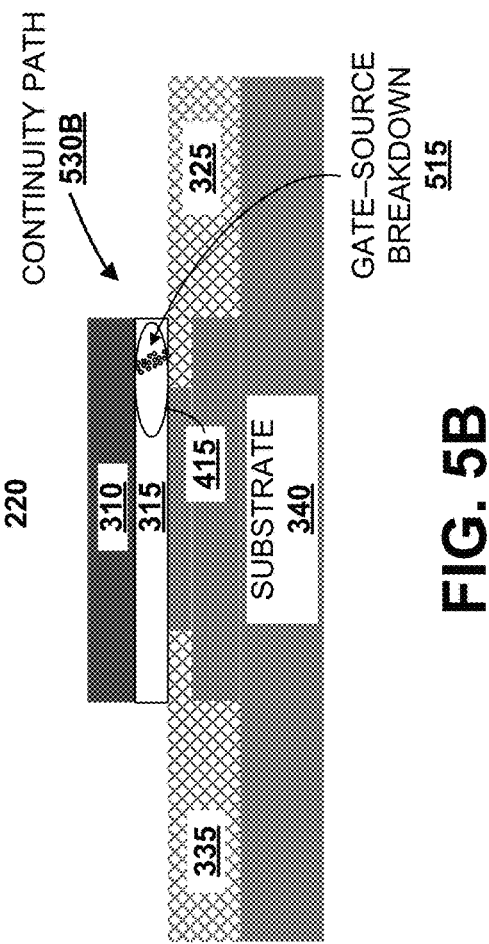
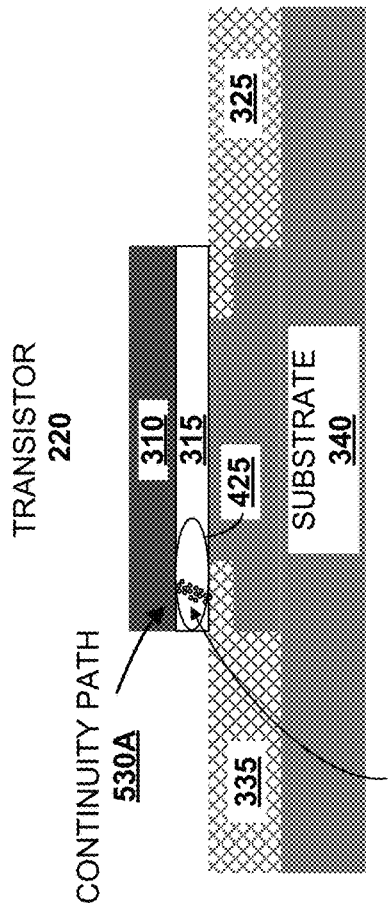

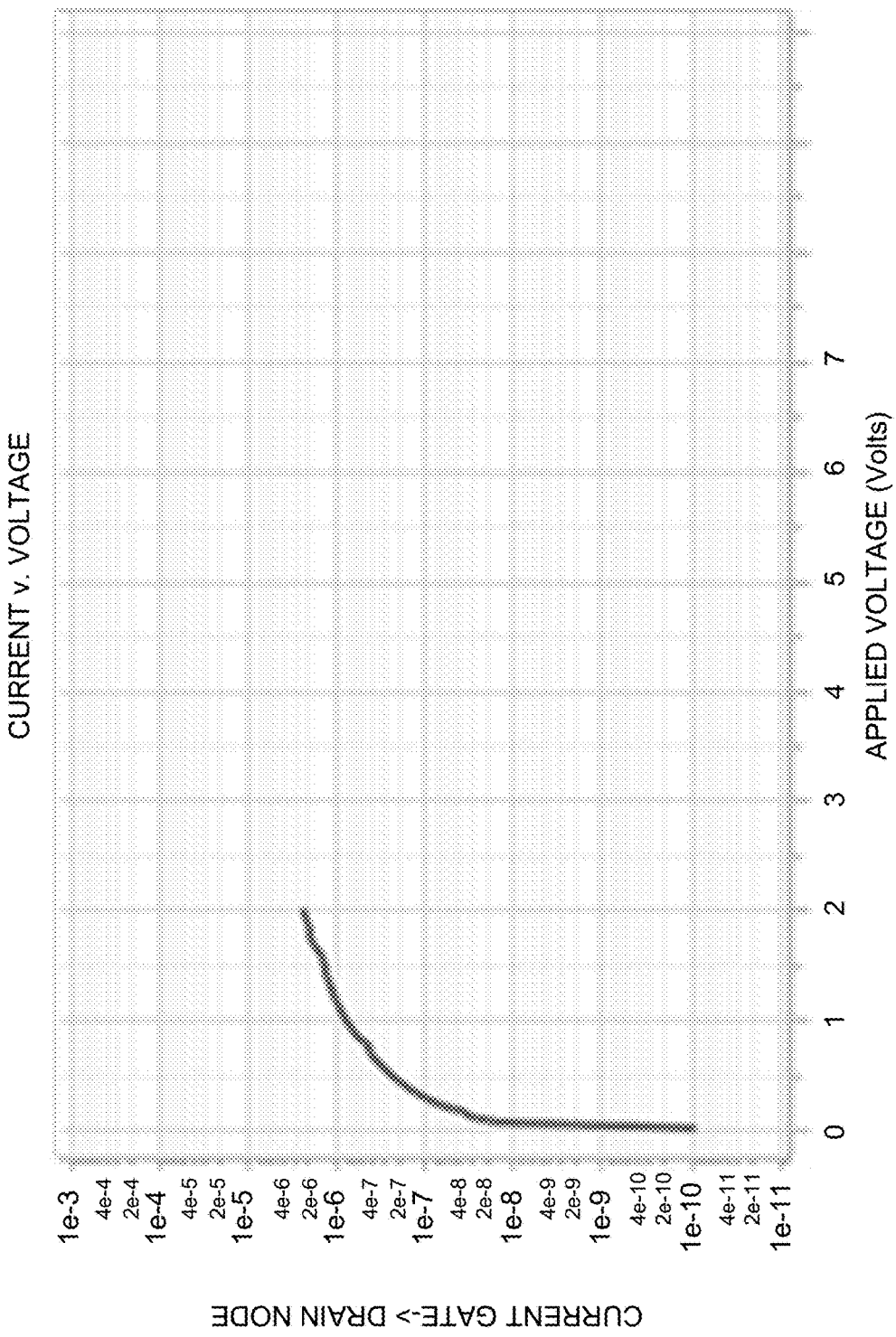

GENERATING PHYSICAL UNCLONABLE FUNCTION DATA FROM A TRANSISTOR OF A SEMICONDUCTOR DEVICE

INCORPORATION BY REFERENCE

U.S. patent application Ser. No. 17/223,817 filed Apr. 6, 2021 and titled DISTINCT CHIP IDENTIFIER SEQUENCE UTILIZING UNCLONABLE CHARACTERISTICS OF RESISTIVE MEMORY ON A CHIP, is hereby incorporated by reference herein in its entirety and for all purposes.

TECHNICAL FIELD

The subject disclosure relates generally to physical unclonable feature data, and as one illustrative example, physical unclonable feature data generated from a transistor of a semiconductor device.

BACKGROUND

Security in electronic communication is relevant at micro and macro scales, from operations of components within a single die to network communications of communicatively interconnected computing devices. Moreover, communication security is relevant at various scales in between the micro and macro levels, as well as for unconventional (or even heretofore unknown) inter-operations of electronic devices. Although variations exist, probably the most common application in the modern context for securing electronic communication is with cryptographic algorithms.

As a general characteristic, cryptographic algorithms tend to leverage highly complex computational schemes that make breaking the algorithm practically impossible, though in most cases not theoretically impossible. The greater the complexity of the cryptographic algorithm the more practical difficulty in breaking it. For this statement to be true, however, certain mathematical assumptions that the algorithm relies upon must also hold true. One such assumption is the true randomness of a numbering scheme leveraged by an algorithm. Where systematic patterns exist within the numbering scheme or the mechanism utilized to generate (random) numbers, an algorithm is more vulnerable to being compromised. To this end, the national institute on standards and technology (NIST) maintains tests for randomness of number generators for use in cryptography applications (see, e.g., A. Rukhin, et al., "A Statistical Test Suite for Random and Pseudorandom Number Generators for Cryptographic Applications", NIST, vol. 800-22, no. rev 1a, p. 131, 2010).

One technique for generating non-correlated number sequences is by leveraging characteristics of physical structures that have high natural entropy. When utilizing entropic physical structures within a semiconductor die itself, a number sequence for an application associated with the die can be produced native to that die. If the physical structures can reliably reproduce a consistent output in response to an input condition, a function can be derived from those physical structures. Moreover, where the entropy associated with the physical structures is independent of the process used to create the structures, the function can model a one-way function that is mathematically difficult to invert. Such structures are referred to as physical unclonable functions (PUFs) and can be useful for generating data having high randomness.

In light of the above, the Assignee of the present disclosure continues to develop and pursue practical utilizations of physical characteristics of integrated circuit devices.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

In one or more embodiments of the present disclosure, a single transistor can be leveraged to generate a physical unclonable function (PUF) data value. A first electric potential can be applied to a gate node of the transistor while the source and drain nodes are maintained in common at a second electric potential. A potential difference across gate node and source node equal to the potential difference across gate node and drain node results. In various embodiments, a magnitude of the potential difference can be selected to cause a conductive breakdown in a gate insulator material separating the gate node from the source and drain nodes. Location of the conductive breakdown within the gate insulator material with respect to the source node and drain node can be characterized as a gate-source breakdown or a gate-drain breakdown, respectively. Moreover, the location of the breakdown can be highly unpredictable, randomly resulting in a higher gate-source current or higher gate-drain current, respectively. A result of the gate insulator breakdown can be binarized based on the gate-source current, gate-drain current or both, in different disclosed embodiments, to generate the PUF data value from the transistor. Moreover, PUF data values generated from multiple transistors can be highly non-correlated and useful for a random data sequence for cryptographic applications in still further embodiments of the present disclosure.

One or more aspects of the present disclosure provide a method for generating data. The method can comprise applying a common voltage across a gate-source junction and a gate-drain junction of a transistor device, and inducing a conductive electrical breakdown in a gate insulator material of the transistor device. Further, the method can comprise stop applying the common voltage across the gate-source junction and the gate-drain junction, and read a gate-source current of the transistor device or a gate-drain current of the transistor device. Moreover, the method can comprise analyzing a current value of the gate-source current or of the gate-drain current of the transistor, and determine a value of a data bit for the transistor device in response to analyzing the current value.

In one or more additional embodiments, a method for implementing a physical unclonable function (PUF) for generating a PUF data sequence is disclosed. The method can comprise determining a number of bits of the PUF data sequence, and selecting a number of transistors of an integrated circuit device equal to the number of bits of the PUF data sequence. The method can additionally comprise applying a common breakdown voltage across a gate-source junction and a gate-drain junction of a transistor of the number of transistors, and including a conductive breakdown in a gate insulator of the transistor. Further, the method can comprise reading a gate-source current or a gate-drain current of the transistor following the common breakdown voltage. In an embodiment(s), the method can additionally comprise analyzing the gate-source current or the gate-drain current with respect to a digitization standard, and furthermore can comprise determining a bit value of one PUF bit of the PUF data sequence from the gate-source current or the gate-drain current of the transistor.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

FIGS. 5A and 5B illustrate gate insulator breakdown conditions digitized for PUF bit generation, in an embodiment(s) of the present disclosure.

FIGS. 7A-7D illustrate example pre and post breakdown current responses at source and drain nodes of a transistor device in still further embodiments.

DETAILED DESCRIPTION

Introduction

Figure 1:
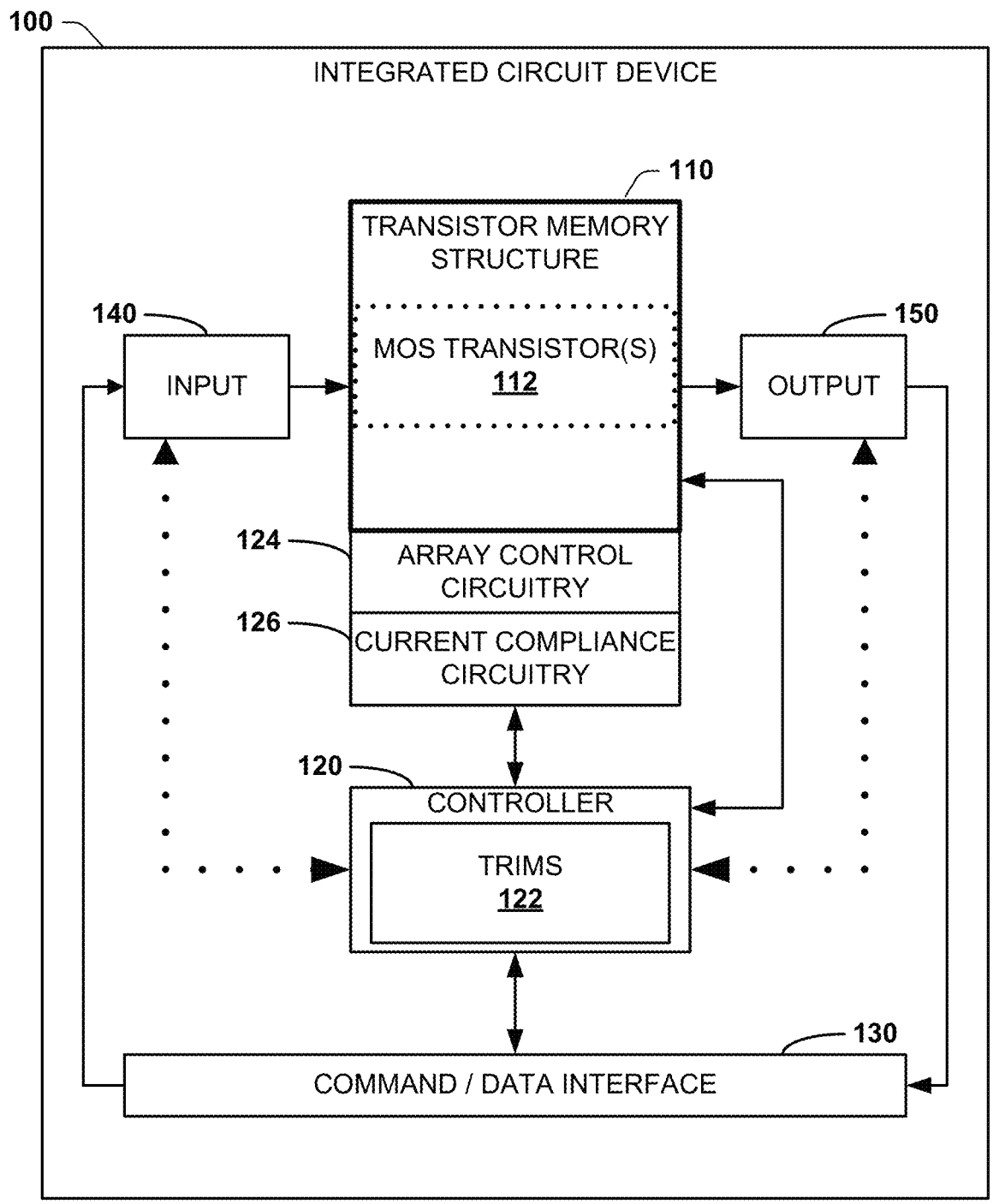
FIG. 1 depicts a block diagram of an example integrated circuit device including a transistor memory structure and transistor array, in an embodiment(s).

One or more embodiments of the present disclosure leverage stochastic or substantially stochastic physical characteristics of a gate insulator material of a transistor with respect to an electrical breakdown process to generate data. Being generally random, stochastic features of integrated circuit devices, such as a transistor, can be leveraged to produce data that has little to no correlation among a population of such devices. As a result, that data can be suited to applications requiring distinct or unique identification, such as identification and authorization particular to a device (e.g., hardware security), identification and authorization of an application executed on the device (e.g., software security), identification and authorization of communications executed across a network of devices (e.g., network security or network communication security), or suitable combinations of the foregoing. As one illustrative example, highly non-correlated data can also be utilized for generating (random) number sequences for cryptographic keys in a cryptographic application, and the like.

In mathematical terms a function is a condition or set of conditions that provide an output in response to an input, and in computer-science a one-way function is a function that is computationally difficult to invert. Such functions are useful in cryptography because of the difficulty in mapping the conditions that produce a correct output when given a random input. Generation of data by applying an input to stochastic physical characteristics can also be referred to as a physical unclonable function (PUF) or physically unclonable function (also PUF). PUF can also refer herein to the characteristics themselves as physically unclonable features (also PUF), physical(ly) unclonable features, or other nomenclature, suitable to produce a physical(ly) unclonable function in conjunction with a data generation process. Data derived from such stochastic physical characteristics as an output are referred to herein as PUF data (or a PUF bit, or group of PUF bits, etc.) and generally involve a process applied to one or more integrated circuit devices assigned by a control device to define a PUF bit(s) (e.g., see controller 120 of FIG. 1, infra).

Aspects of the present disclosure provide generation of PUF data from an electric, magnetic, or electromagnetic process(es) applied to an integrated circuit device, such as a transistor. In some disclosed aspects, the integrated circuit device(s) selected for generation of PUF data is a native integrated circuit device (sometimes referred to as a virgin device) that has not had such a process previously applied thereto, following manufacture (optionally excluding validation tests performed by a chip manufacturer). In other aspects non-native integrated circuit devices previously exposed only to reversible or substantially reversible processes can be utilized for generating PUF data. Example processes can include a forming process (e.g., comprising one or more forming pulses preparing a transistor channel region for electrically reversible programming), a program process (e.g., comprising one or more electrical program pulses reducing electrical resistivity of the channel region), an erase process (e.g., comprising one or more electrical erase pulses increasing electrical resistivity of the channel region), an overwrite process, and so forth. In addition, PUF data generated from a set of transistors can thereafter be stored at the transistor(s) (or, optionally, at other volatile or non-volatile memory devices on the integrated circuit) and read from at least a subset of the transistor(s) utilized to generate the PUF data (or memory devices to which the data is relocated).

Integrated circuit devices suitable for generating PUF data according to the disclosed embodiments include transistors. For instance, gate insulated transistors can be utilized for generating PUF data according to the disclosed embodiments. Such transistors can include any suitable field effect transistor (FET) like a junction-gate FET (JFET), a metal-oxide semiconductor FET (MOSFET) including a p-type MOS (PMOS), an n-type MOS (NMOS), complementary MOS (CMOS), multi-gate FET, FinFET, floating-gate MOSFET and power MOSFET among other MOSFET transistors, a carbon nanotube FET, organic FET, and so forth. Where suitable to one of ordinary skill in the art, the foregoing transistor technologies, similar gate insulated transistor technologies, or suitable subsets thereof are considered within the meaning of transistor for one or more embodiments of the present disclosure.

In one or more additional embodiments, some disclosed data generation processes can be rendered permanent through one-time programmable processes, allowing data to be reliably re-read over a very large number of read cycles to reliably and accurately reproduce a previously generated data sequence, achieving extremely low bit error rates. For example, where a gate insulator breakdown induced in a gate-source junction (or gate-drain junction) is determined, a strong followup pulse across the gate-source junction can be applied to mitigate or avoid reversal of the gate insulator breakdown.

In still further embodiments, disclosed processes for generating PUF data can involve processes compatible with conventional transistor operation. For instance, a set of trims utilized for programming a non-volatile transistor can be modified to induce a gate insulator breakdown as described herein. The modification can involve a modification of a program voltage, a modification of a pulse duration, a modification of a polarity of a pulse, a modification of a number of pulses, or a suitable combination of the foregoing to achieve the gate insulator breakdown. By utilizing (modified) conventional transistor operation processes, a set of transistor devices can be selected post-fabrication from any suitable subset of transistor devices formed on a chip. Systems and methods are further provided to export control of integrated circuit device selection, data sequence process selection and process configuration—associated with physically unclonable data sequence generation disclosed herein—to a user of the chip post-fabrication. Various other embodiments will be readily apparent based on the disclosure herein and the associated drawings.

As utilized herein, the term "substantially" and other relative terms or terms of degree (e.g., about, approximately, substantially, and so forth) are intended to have the meaning specified explicitly in conjunction with their use herein, or a meaning which can be reasonably inferred by one of ordinary skill in the art, or a reasonable variation of a specified quality(ies) or quantity(ies) that would be understood by one of ordinary skill in the art by reference to this entire specification (including the knowledge of one of ordinary skill in the art as well as material incorporated by reference herein). As an example, a term of degree could refer to reasonable manufacturing tolerances about which a specified quality or quantity could be realized with fabrication equipment. Thus, as a specific illustration, though non-limiting, for an element of an integrated circuit device expressly identified as having a dimension of about 50 angstroms (A), the relative term "about" can mean reasonable variances about 50 A that one of ordinary skill in the art would anticipate the specified dimension of the element could be realized with commercial fabrication equipment, industrial fabrication equipment, laboratory fabrication equipment, or the like, and is not limited to a mathematically precise quantity (or quality). In other examples, a term of degree could mean a variance of +/−0-3%, +/−0-5%, or +/−0-10% of an expressly stated value, where suitable to one of ordinary skill in the art to achieve a stated function or feature of an element disclosed herein. In still other examples, a term of degree could mean any suitable variance in quality(ies) or quantity(ies) that would be suitable to accomplish an explicitly disclosed function(s) or feature(s) of a disclosed element. Accordingly, the subject specification is by no means limited only to specific qualities and quantities disclosed herein, but includes all variations of a specified quality(ies) or quantity(ies) reasonably conveyed to one of ordinary skill in the art by way of the context disclosed herein.

Process techniques for fabricating integrated circuit devices on a semiconductor die can cause physical properties having the stochastic or substantially stochastic characteristics suitable for generating PUF data. For instance, these physical properties can have little or no replication or repetition among fabricated structures made by the same process. As one example, a gate insulator layer(s) of a gate-mediated transistor device can have very high uniformity among devices on a chip. This results in random or near-random nano-scale variations in physical characteristics of the insulator layer (e.g., layer thickness, layer permeability, atomic-level defects and so forth). As a result, location of conductive breakdown channels in the gate insulator layer can be highly random, resulting in random variation in current at nodes of a transistor device based on proximity of the node(s) to the conductive breakdown channel in the gate insulator layer. This variation in current can be leveraged to form a physical unclonable function (PUF) yielding PUF data, as described in more detail herein.

As utilized herein, the term "native", "original", "virgin" or the like refers to post-fabrication but pre-commercial operation of integrated circuit devices on a semiconductor die. Native (and like terminology) need not exclude some or all post-fabrication operations such as quality testing or other verification routines performed by a manufacturer, and even some pre-commercial operation by a non-manufacturer such as testing to ensure manufacturer quality specifications are met by a chip, chip setup routines or configuration routines, among others. In general, a transistor device is in a native state, as utilized herein, if it has not yet received a stimulus (e.g., electrical, thermal, magnetic, or a like stimulus known in the art, suitable combinations thereof, and so forth) suitable to form a conductive channel region within the transistor device and change the transistor device from an electrically resistive state to an electrically conductive state as described herein or known in the art.

According to convention, a transistor device is generally programmed in response to a program voltage applied to a gate node of the transistor device suitable to form an electrically conductive region in a channel layer adjacent to the gate node. A read pulse can be applied across source and drain nodes of the transistor device to determine a source-drain current. A source-drain current exceeding a threshold magnitude (or range of magnitudes) confirms a programmed (turned ON) transistor, whereas a source-drain current less than the threshold magnitude (or range of magnitudes) indicates an unprogrammed (turned OFF) transistor. In response to the program voltage being removed from the gate node (or charge being drained from the gate node in the context of a charge-trapping gate) the channel layer becomes electrically resistive, causing the source-drain current to drop below the threshold magnitude (or range of magnitudes). A conductive state of the channel layer vis-à-vis the threshold magnitude(s) can be utilized to define a data bit from the transistor. In one convention, the electrically conductive channel layer having the source-drain current greater than the threshold magnitude(s) can be assigned a bit value of '1' whereas the electrically resistive channel layer having the source-drain current less than the threshold magnitude(s) can be assigned a bit value of '0', thereby digitizing the conductive state of the transistor device.

Aspects of the present disclosure provide a large bias to a gate node of a transistor device to induce an electrical breakdown in a gate insulator layer of the transistor device. In normal operation, the gate insulator of the transistor device remains electrically insulating and the transistor device is reversibly programmable by changing electrical characteristics of a channel layer. In contrast, the present disclosure provides a physical unclonable function (PUF) associated with forming a non-reversible electrically conductive region within the gate insulator. An output of the PUF can be digitized based on location of the electrically conductive region with respect to a source node or a drain node of the transistor device, and associated gate-drain current or gate-source current resulting from the induced electrical breakdown. This is in contrast to the typical digitization of a transistor device based on electrically reversible source-drain current.

Overview

FIG. 1 illustrates a block diagram of an example integrated circuit device 100 for an electronic device according to one or more embodiments of the present disclosure. Integrated circuit device 100 includes a transistor memory structure 110 comprising a set of metal oxide semiconductor (MOS) transistors 112. As noted hereinabove, MOS transistors 112 can be any suitable type of insulated gate transistor device. In an embodiment, MOS transistors 112 can be formed in an array of transistors (e.g., see FIG. 2, infra), whereas in other embodiments MOS transistors 112 can be embodied by multiple arrays of transistors, one or more transistors grouped in a non-array manner, or the like or any suitable combination of the foregoing.

It should be appreciated that MOS transistors 112 are not limited by function of the insulated gate transistor device. For instance, MOS transistors 112 can include gate insulated transistors configured for non-volatile memory functions or volatile memory functions. Still further, MOS transistors 112 can include gate insulated transistors configured as an electronic switch(es), a charge-trapping device(s), and many other electromagnetic circuit functions. MOS transistors 112 are therefore not limited to transistors specially prepared for PUF data generation or implementing a physical unclonable function. Rather, any suitable transistor technology having relatively consistent gate insulator layer characteristics on a semiconductor die can be utilized for MOS transistors 112.

Controller 120 is provided to select subsets (e.g., one or more) of transistors of MOS transistors 112 for electronic operations. Controller 120 can utilize row and column selection circuitry (including multiplexers; see FIG. 11, infra) and processes associated with implementing electrical operations on transistor devices (e.g., FIGS. 11 and 12, infra), and utilize those circuitries and processes for generating PUF data, storing PUF data and reading PUF data for security applications. Such selection and processing circuitry can be incorporated within array control circuitry 124.

When embodied in an array (e.g., see FIG. 2, infra), controller 120 can be coupled to array control circuitry 124 to select one or more transistors for an electronic operation. Though non-limiting, electronic operations can include a PUF operation configured for generating one or more PUF data bits, as well as reading results of the PUF operation, storing results of the PUF operation, and outputting a response to a query based on the PUF operation, among others. Instructions for implementing the PUF operation can be stored in trim instructions 122. Such instructions can specify a number of transistors to select for the PUF operation: such as one transistor per PUF bit, and electrical signals, signal timing and the like suitable to accomplish the electronic operations. Specific examples of instructions stored in trim instructions 122 can include: electrical signals to be applied to array control circuitry 124 to select the number of transistors for the PUF operation, optionally electrical signals to be applied to non-selected transistors of MOS transistors 112 to insulate them from being affected by the PUF operation, electrical signals to be applied to selected transistors to accomplish the PUF operation (e.g., see FIGS. 4-6, infra), electrical signals to be applied to selected transistors to read results of the PUF operation, instructions to store the results of the PUF operation in memory (e.g., in transistor memory structure 110, or other memory of integrated circuit device 100), and metadata to identify the location of the stored results of the PUF operation and retrieve the stored results.

Also illustrated in integrated circuit device 100 is an input(s) 140 and output(s) 150. In some embodiments, input(s) 140 can include (or provide a pathway for) data to be stored within transistor memory structure 110. Output(s) 150 can output data stored within and retrieved from transistor memory structure 110 by controller 120. In some embodiments, output(s) 150 can output acknowledgment data that results from computations utilizing PUF data generated from a PUF operation, such as successful cryptographic key match for a cryptography application or identity match for an identifier application, or other suitable security function suitable for use with generated PUF data.

A command/data interface 130 is provided to receive commands (e.g., memory commands, cryptography commands, identification commands, etc.) from an external device and respond to those commands. Further, data to be written to transistor memory structure 110 can be received by way of command/data interface 130, and data output from transistor memory structure 110 can be provided over command/data interface 130. In at least some embodiments, controller 120 can dynamically expose transistor memory structure 110 to an external host device (separate from integrated circuit device 100—not depicted) by way of command/data interface 130. In such embodiments the external host device can select subsets of MOS transistors 112 for implementing a PUF operation on selected transistors. In various example implementations, the external host device can be manufactured separately and communicatively interconnected by one or more network or device interfaces to command/data interface 130 to accomplish this embodiment(s).

Array control circuitry 124 can include current compliance circuitry 126. Current compliance circuitry 126 can be selectively connected to or disconnected from subsets of transistors of MOS transistors 112 together with array control circuitry 124 and controller 120. Furthermore, current compliance circuitry 126 can be configured to limit current through a node connected thereto to a maximum current. The maximum current can be selected from a range of currents by controller 120 in some embodiments, or in other embodiments, the maximum current can be fixed by hardware components of current compliance circuitry 126.

In one or more additional embodiments, controller 120 can be configured to select a number of transistors of MOS transistors 112 to generate a PUF data sequence. In an embodiment, the number of transistors selected can be equal to a number of bits in the PUF data sequence. For example, 256 transistors can be selected for a PUF data sequence having 256 bits. In some embodiments, controller 120 can select one or more additional transistors above the number of bits in the PUF data sequence. The additional transistors can be utilized in the event controller 120 identifies an invalid PUF bit associated with a transistor. Upon detecting an invalid PUF bit controller 120 can substitute one of the additional transistors to produce a valid PUF bit in place of the invalid PUF bit.

In some disclosed embodiments, controller 120 can be configured to select native transistor devices of MOS transistors 112 having never been previously programmed in conjunction with a PUF operation. In other embodiments, controller 120 can be configured to select transistor devices having less than a threshold number of previous program operations in conjunction with a PUF operation.

Figure 2:
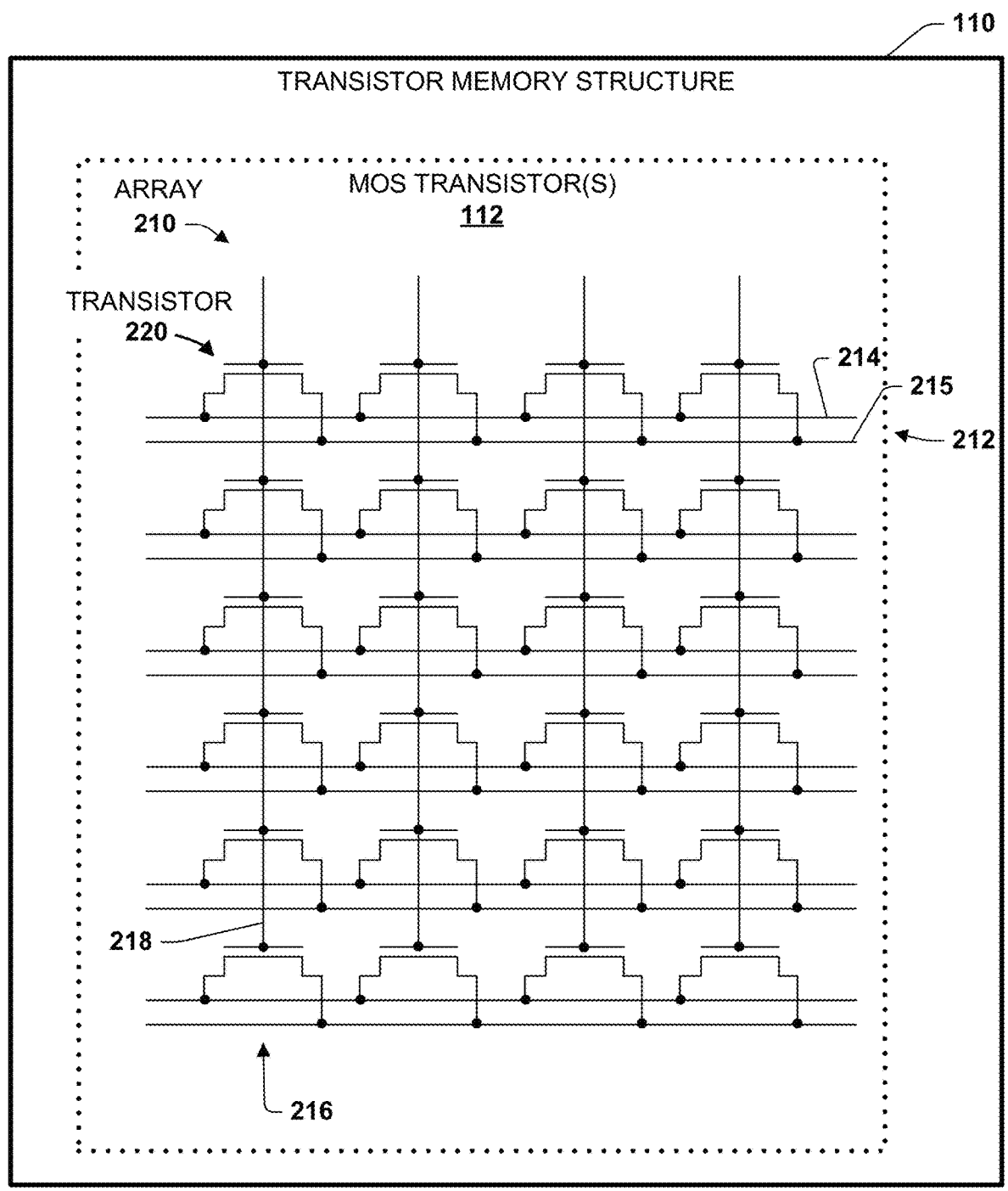
FIG. 2 illustrates an example schematic diagram of an array of transistor devices, in further embodiments.

Referring now to FIG. 2, there is disclosed a block diagram of transistor memory structure 110. MOS transistors 112 are organized into an array 210 of transistors 220 as shown. Array 210 of transistors 220 is organized into rows 212 and columns 216. Each row 212 of transistors 220 includes a source bitline 214 interconnecting respective source nodes of the transistors 220 in a given row 212 and a drain bitline 215 interconnecting respective drain nodes of the transistors 220 in that row. Columns 216 of transistors 220 are coupled to respective wordlines 218 of array 210 at respective gate nodes of the transistors 220. It should be noted that array 210 is only provided as an example arrangement of transistors 220, and other organizations of columns and rows, bitlines, wordlines, sourcelines, datalines and other interconnections of transistors 220 to such conductive lines of an array are within the scope of the present disclosure that give independent gate, source and drain access to transistors 220 of array 210. Thus, array 210 can be a NOR array, or other logical arrangement satisfying these requirements.

A controller 120 communicatively or operably coupled with transistor memory structure 110 can access a transistor 220 or groups of transistors 220 of array 210. Selection of a single bitline—for example by applying a selection voltage on the single bitline—and selection of a single wordline—by applying ground, or a low voltage on the single wordline—effectively selects a single transistor connected both to the single bitline and the single wordline for an electrical operation. Selection of multiple bitlines or multiple wordlines, or multiple bitlines and wordlines can be utilized to select multiple transistors for the electrical operation in further embodiments.

Figure 3:
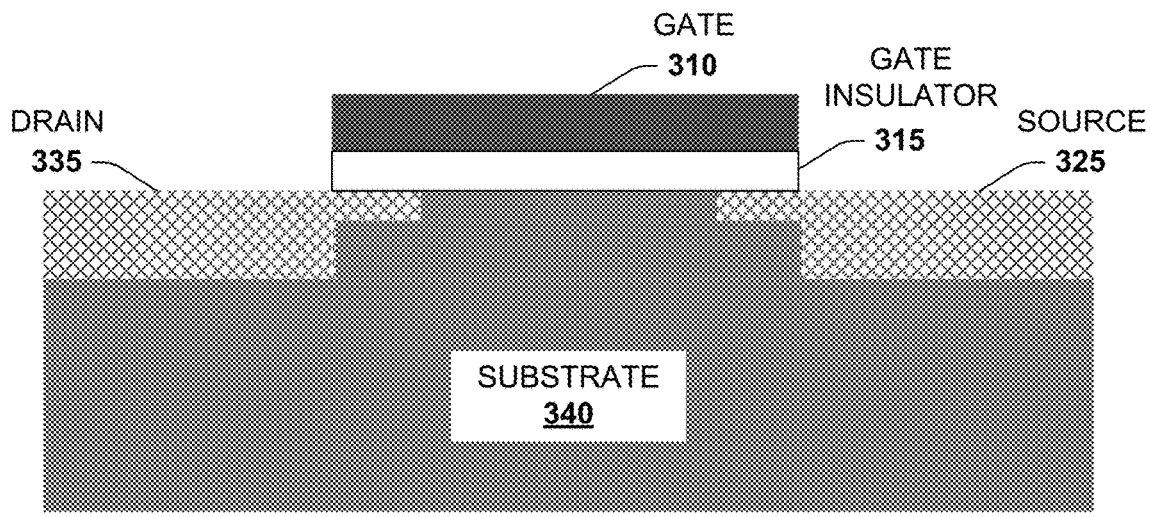
FIG. 3 depicts a block diagram of an example component diagram for a transistor device, in additional embodiments.

FIG. 3 depicts a block diagram of an example transistor 220 according to further embodiments of the present disclosure. Transistor 220 illustrates one example of an insulated gate transistor, and is not intended to limit the scope of insulated gate transistors embodied by transistor 220. Rather, any suitable insulated gate transistor as described herein or known in the art can be utilized for transistor 220.

As shown transistor 220 includes a gate node 310 adjacent to a gate insulator layer 315. Additionally, a source node 325 and drain node 335 are formed within a substrate 340 at opposing sides of gate node 310. Gate insulator 315 can prevent (or substantially prevent) free charges at gate node 310 from transferring through gate insulator layer 315, in various embodiments. As a result, current from gate node 310 to a source node 325 is very small (e.g., less than 1 nanoamp (nA) in various embodiments) and current from gate node 310 to a drain node 335 is very small while gate insulator layer 315 is intact. Gate node 310 can be a floating gate node or some other gate node design according to various embodiments. In some embodiments, gate insulator 315 can be an electrically insulating material such as a semiconductor oxide and a metal oxide material(s). Examples of the gate insulator material include a silicon dioxide material, a hafnium oxide material, or the like.

Figure 4:
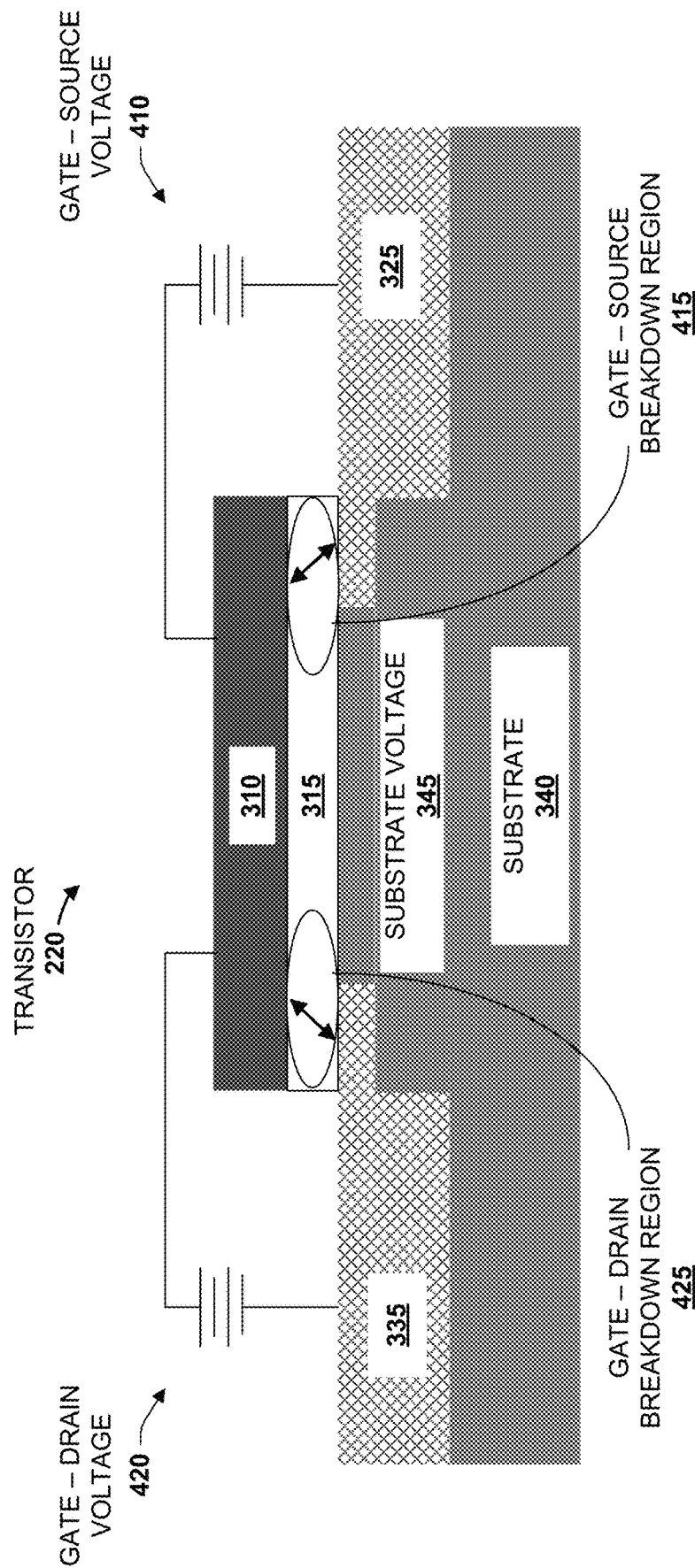
FIG. 4 depicts an example block diagram of an operation to generate a physical unclonable function (PUF) data bit utilizing a single transistor, in an embodiment(s).

FIG. 4 illustrates a block diagram of an example PUF operation 400 applied to a transistor 220 according to various embodiments of the present disclosure. PUF operation 400 can be implemented by controller 120 utilizing array control circuitry 124 in various embodiments. The PUF operation 400 can utilize current compliance circuitry 126, as well as other peripheral circuitry in various embodiments (e.g., see FIGS. 11 and 12, infra).

PUF operation 400 includes a voltage applied across gate node 310 and source node 325, referred to as a gate-source voltage 410. Additionally, a voltage is applied across gate node 310 and drain node 335, referred to as a gate-drain voltage 420. In various embodiments, gate-source voltage 410 and gate-drain voltage 420 can be configured to be the same or identical by applying a common voltage to both drain node 335 and source node 325 (e.g., a common ground, a common low voltage, a common high voltage, a common negative voltage, etc.), and a voltage of differing magnitude from the common voltage at gate node 310.

A magnitude of the gate-source voltage 410 and of the gate-drain voltage 420 can be selected to induce a conductive electrical breakdown in gate insulator 315. The magnitude can be between about 3 volts and about 5.5 volts in various embodiments, or any suitable value or range there between (e.g., 3.25 volts, 3.5 volts, 3.75 volts, 4 volts ... 5 volts, 5.25 volts, 5.5 volts, 5.75 volts, 3-4 volts, 3.5-4.5 volts, 3.5-5 volts, 4-5 volts, 4.5-5.5 volts, and so forth). Moreover, the magnitude can be selected to induce the conductive electrical breakdown within a pulse time duration, such as 1 microsecond (us), 1.5 us, 2 us, or other suitable value. In still further embodiments, the magnitude can be selected to induce the conductive electrical breakdown within a duration of a plurality of voltage pulses (e.g., 2 pulses, 3 pulses, ... ), or the like.

Modern manufacturing processes for forming a gate insulator 315 in semiconductor fabrication technology can be highly consistent. As a result, a location within gate insulator 315 at which the conductive electrical breakdown forms in response to gate-source voltage 410 and gate-drain voltage 420 can be very random. Referring also to FIGS. 5A and 5B, a conductive electrical breakdown located within gate-source breakdown region 415 is referred to hereinafter as a gate-source breakdown 515. Conversely, a conductive electrical breakdown located within gate-drain breakdown region 425 is referred to hereinafter as a gate-drain breakdown 525. Proximity of gate-source breakdown 515 to source node 325 results in a continuity path 530B yielding a measurably higher gate-source junction current than a gate-drain junction current of transistor 220 (see, e.g., FIGS. 7A-7D, infra). Likewise, proximity of gate-drain breakdown 525 to drain node 335 results in a continuity path 530A yielding a measurably higher gate-drain junction current than gate-drain junction current.

Figure 6:
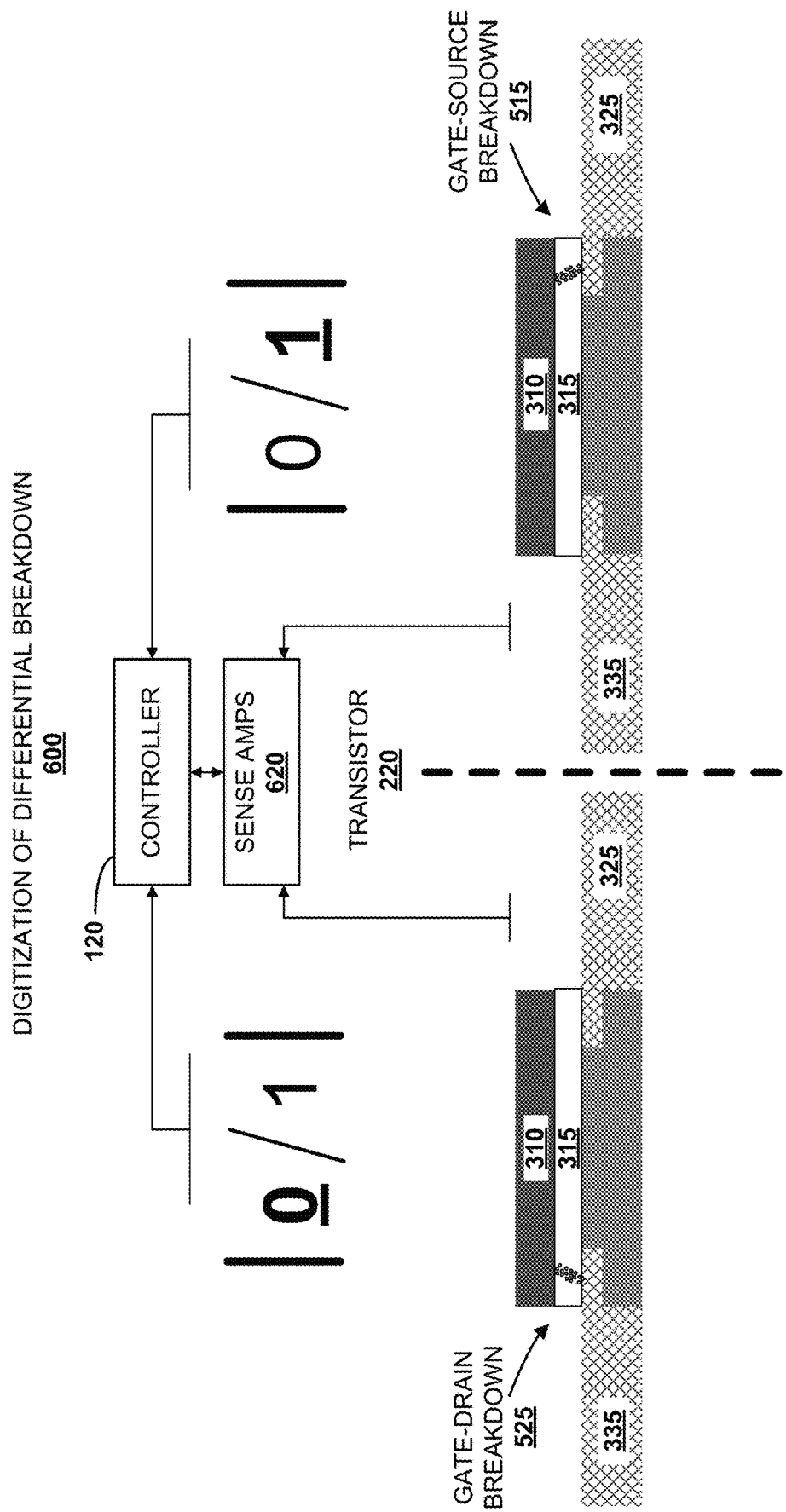
FIG. 6 depicts a block diagram of an example binary digitization rule for generating a PUF bit value from gate insulator breakdown conditions, in further embodiments.

Referring to FIG. 6, disclosed is a digitization protocol 600 for determining a data value of a PUF bit in response to inducing an electrical breakdown within gate insulator 315. A controller 120 can employ sense amps 620 to read a magnitude of current through a gate-source junction of transistor 220 and a second magnitude of current through a gate-drain junction of transistor 220. Comparison of the current magnitude to a threshold breakdown current (or a range of threshold breakdown currents) can be utilized to determine whether a gate-source breakdown 515 or a gate-drain breakdown 525 has been induced within gate insulator 315. For instance, where gate-source junction current exceeds the threshold breakdown current (or range of currents) controller 120 can determine gate-source breakdown 515 has occurred in response to PUF operation 400 and assign a first data value (e.g., 1 or 0) to a PUF bit associated with transistor 220. In contrast, where gate-drain junction current exceeds the threshold breakdown current (or range of currents) controller 120 can determine gate-drain breakdown 525 has occurred in response to PUF operation 400 and assign a second data value (e.g., 0 or 1) to the PUF bit associated with transistor 220. In various embodiments, the threshold current can be from about 0.5 uA to about 2.5 uA, or any suitable value or range therebetween (e.g., 1 uA, 1.5 uA, 2 uA, etc., 0.5 uA to 1.0 uA, 1.0 uA to 1.5 uA, 1.5 uA to 2.0 uA, and so forth).

In alternative embodiments, controller 120 can distinguish a gate-source breakdown 515 from a gate-drain breakdown 525 by comparing the gate-source junction current to the gate-drain junction current. Where the gate-source junction current exceeds the gate-drain junction current—optionally by a predetermined value, percentage or the like—controller 120 can determine the gate-source breakdown 515 has occurred in response to PUF operation 400 and assign the first data value to the PUF bit associated with transistor 220. Conversely, where the gate-drain junction current exceeds the gate-source junction current—optionally by the predetermined value, percentage or the like—controller 120 can determine the gate-drain breakdown 525 has occurred in response to PUF operation 400 and assign the second data value to the PUF bit associated with transistor 220. In various embodiments, the predetermined value, percentage or the like by which one current exceeds another to satisfy the determination of a PUF bit value can be 30% or larger in current magnitude, 50% or larger in magnitude, 100% or larger, 2-5 times larger, an order of magnitude larger, two orders of magnitude larger, or another suitable value or range of values.

In further embodiments, referring again to FIG. 4, a substrate voltage 345 can be applied to substrate 340. Substrate voltage 345 can be a same polarity as the voltage applied to gate node 310 as part of PUF process 400. As a result, a potential difference across a gate-substrate junction of transistor 220 can be less than gate-source voltage 410 and gate-drain voltage 420, mitigating or avoiding a likelihood that a conductive electrical breakdown forms between gate-drain breakdown region 425 and gate-source breakdown region 415. This in turn mitigates or avoids a likelihood that gate-source junction current and gate-drain junction current are not measurably distinct (or are not different by more than a predetermined value or range of values), which can result in an invalid PUF bit. Accordingly, substrate voltage 345 can mitigate or avoid invalid results of PUF operation 400. In an embodiment, substrate voltage can be between about 0.5 volts and about 3.5 volts, or any suitable value or range there between (e.g., 0.5 volts, 1 volt, 1.5 volts, 2 volts, etc., or a range between 1 volt and 3 volts, 1.5 volts and 2.5 volts, 1.5 volts and 2 volts, and so forth). In further embodiments, substrate voltage 345 and the gate node voltage can be selected so that a gate-substrate junction voltage can be about 3 volts or less, about 2.5 volts or less, about 2 volts or less, about 1.5 volts or less or about 1 volt or less.

Figure 7A:
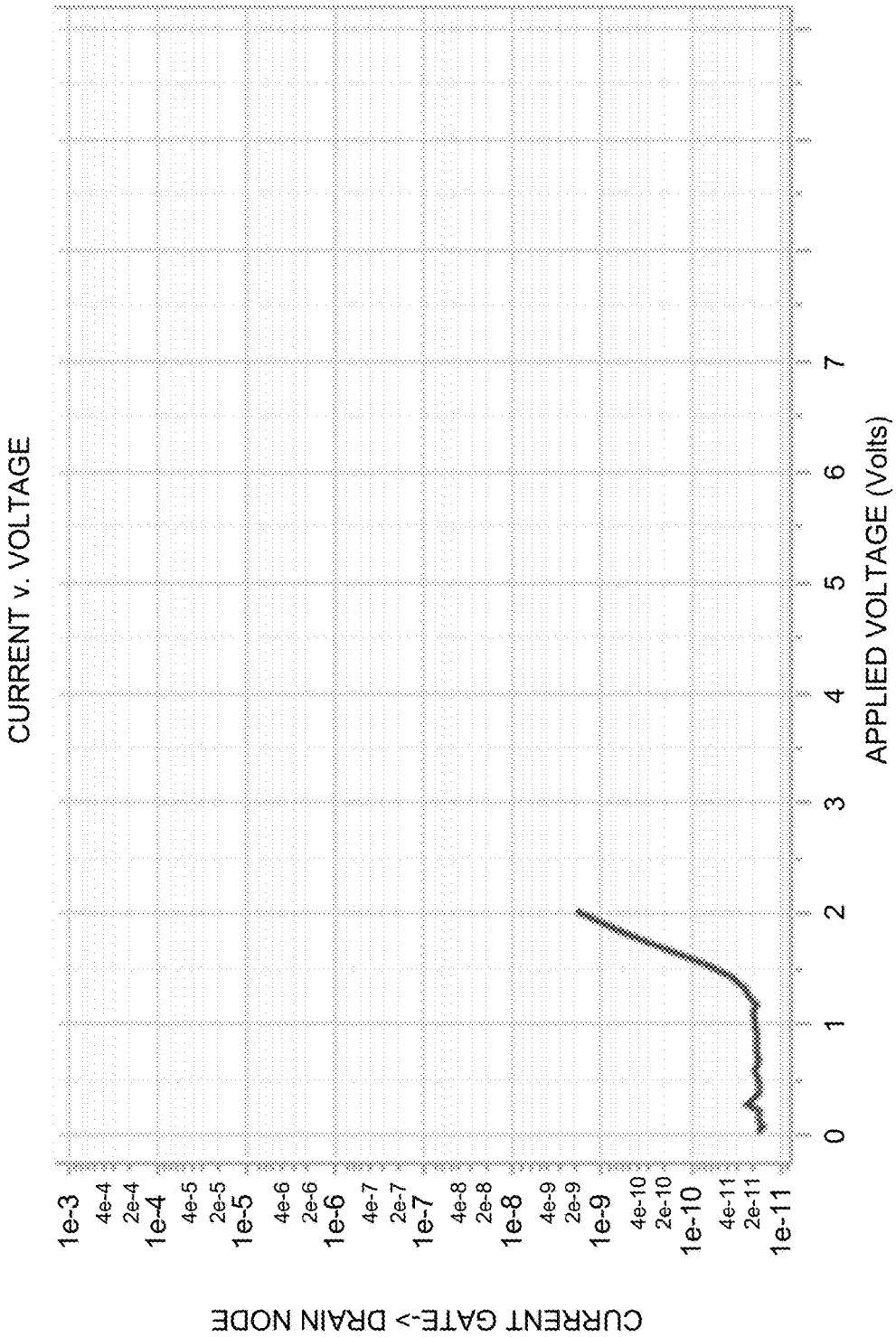
Figure 7B:
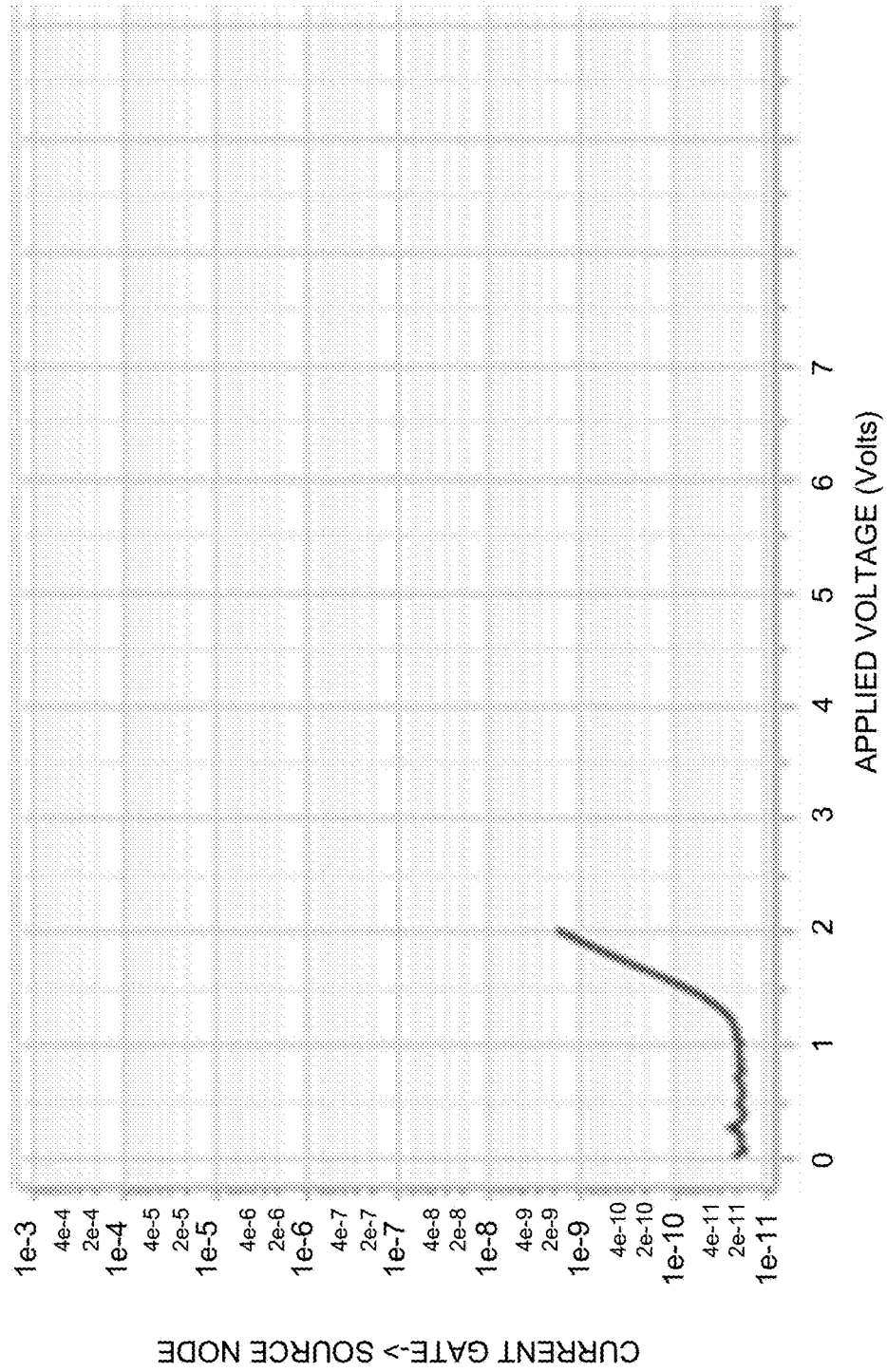
Figure 7D:
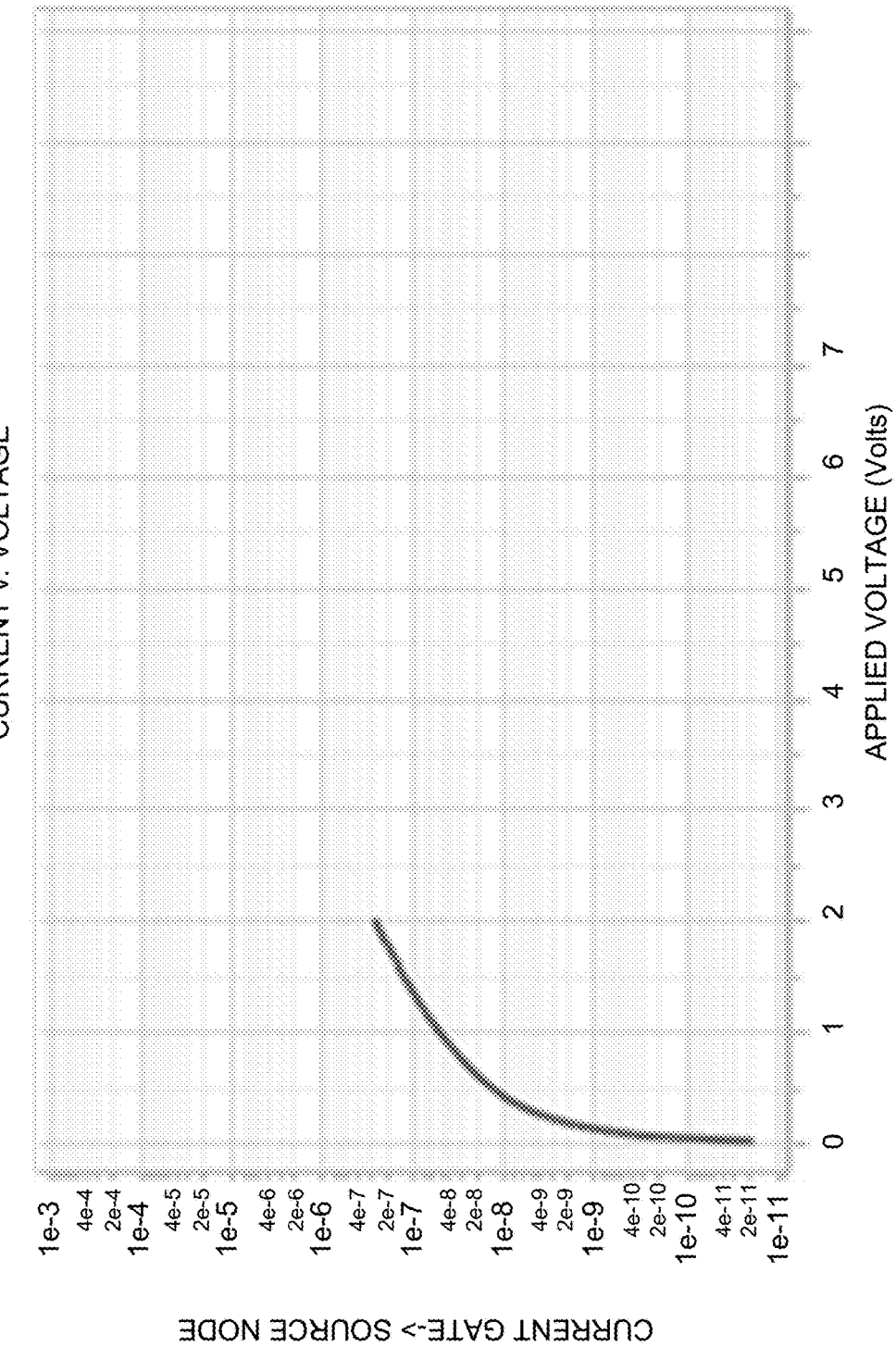

FIGS. 7A and 7B illustrate current v. voltage graphs including a gate-drain current 700A and gate-source current 700B of a transistor 220 prior to formation of a conductive breakdown in gate insulator 315. Both current responses remain quite low, increasing only after about 1.25 volts due to electron tunneling phenomena. At 2 volts however, both junction currents remain at or below about 2 nanoAmps (nA) demonstrating electrical insulation integrity of gate insulator 315. FIG. 7C depicts gate-drain current 700C following formation of an electrical conductive breakdown in gate insulator 315, such as a gate-drain breakdown 525 or a gate-source breakdown 515. Similarly, FIG. 7D illustrates gate-source current 700D following formation of the electrical conductive breakdown in gate insulator 315. At 2 volts, gate-source current 700D is about 300 nA whereas gate-drain current 700C is about 3 uA, approximately an order of magnitude larger than gate-source current 700D. Accordingly, the current v. voltage graphs of FIGS. 7A-7D demonstrate existence of a continuity path 530A in a vicinity of a gate-drain junction embodied by a gate-drain breakdown 525. Accordingly, controller 120 can determine a bit value of an associated PUF bit based upon comparing gate-drain current 700C to gate-source current 700D (optionally within a predetermined value or range) or by comparing gate-drain current 700C or gate-source current 700D to a threshold current breakdown value or a range of threshold current breakdown values.

The diagrams included herein are described with respect to several circuits, controllers, and arrays of transistor devices or an integrated circuit device(s) comprising multiple circuits, controllers, or arrays. It should be appreciated that such diagrams can include those circuits, controllers, etc., specified therein, some of the specified circuits/controllers/arrays, or additional circuits/controllers/arrays not explicitly depicted but known in the art or reasonably conveyed to those of skill in the art by way of the context provided herein. Components of disclosed integrated circuit devices can also be implemented as sub-components of another disclosed component (e.g., input 140 and output 150 can be sub-components of controller 120), whereas other components disclosed as sub-components can be separate components in various embodiments (e.g., trim instructions 122 can be stored separate from controller 120). Further, embodiments within a particular Figure of the present specification can be applied in part or in whole to other embodiments depicted in other Figures for achieving a function or purpose disclosed herein or reasonably conveyed to one of skill in the art. As illustrative (and non-limiting) examples, array control circuitry 124 of FIG. 1 can be embodied by some or all array control components of FIG. 11 (e.g., row control 1104, sense amps and write circuits 1108, column control 1106, clock source(s) 1110, address register 1114, reference and control signal(s) generator 1118, state machine 1120, input/output buffer 1112, command interface 1116), or suitable components of operating and control environment 1100 or environment 1200 can be substituted or added to other components or integrated circuit devices disclosed herein, and so forth. Additionally, it is noted that one or more disclosed processes can be combined into a single process providing aggregate functionality. For instance, a write process can comprise a read-verify process, or vice versa, to facilitate storing data at memory or generating data within memory and reading that stored/generated data, by way of a single process. Components of the disclosed architectures can also interact with one or more other components not specifically described herein but known by those of skill in the art.

Figure 8:
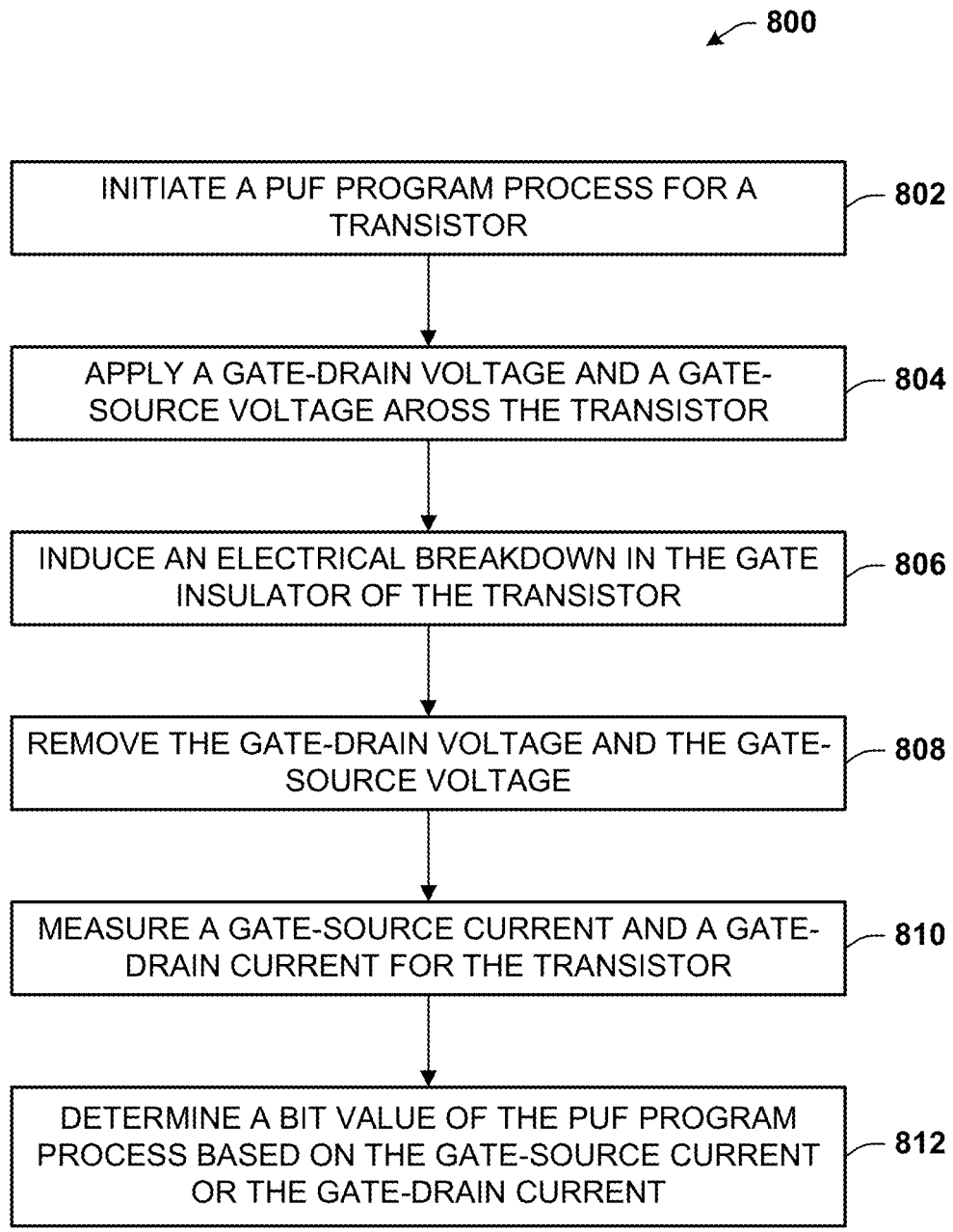
FIG. 8 illustrates a flowchart of a sample method for a PUF program process for generating a PUF data value from a transistor, according to further disclosed embodiments.
Figure 9:
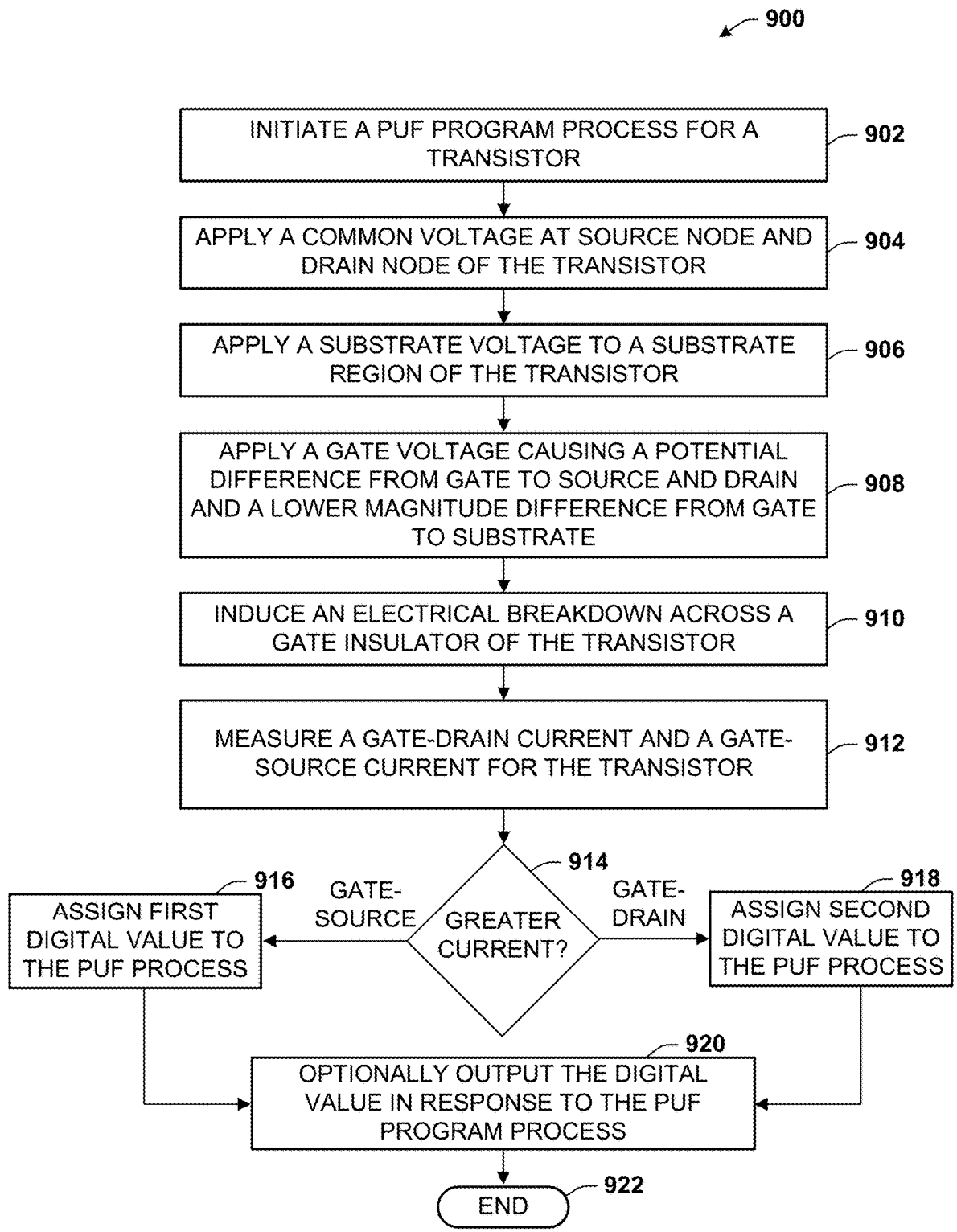
FIG. 9 depicts a flowchart of a sample method for digitizing a PUF bit value from a stochastic location of gate insulator breakdown in a transistor, in an embodiment.
Figure 10:
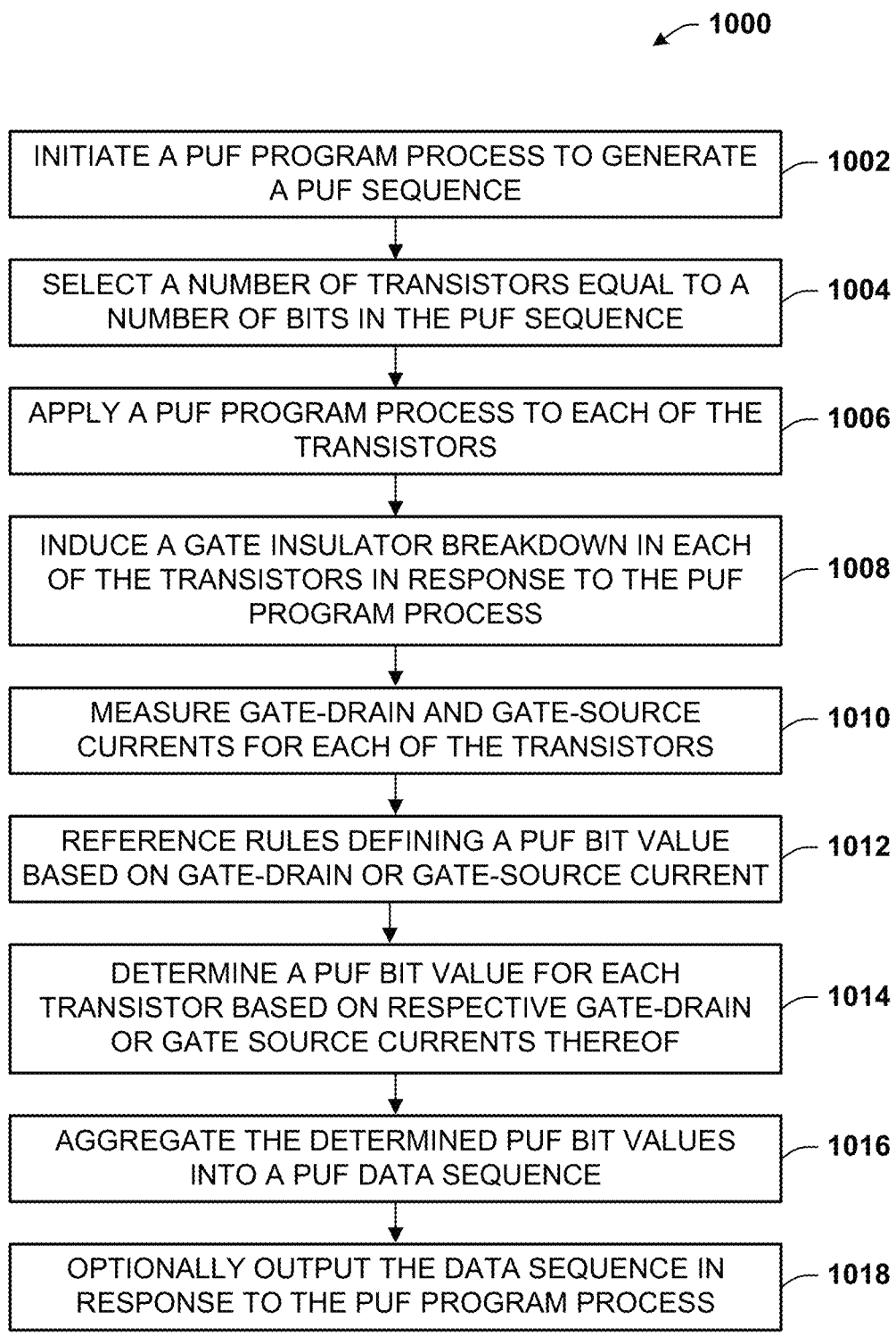
FIG. 10 illustrates a flowchart of a sample method for generating a PUF data sequence from an array of transistors according to further disclosed embodiments.

In view of the exemplary diagrams described supra, process methods that can be implemented in accordance with the disclosed subject matter will be better appreciated with reference to the flow charts of FIGS. 8-10. While for purposes of simplicity of explanation, the methods of FIGS. 8-10 are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methods described herein, and in some embodiments additional steps known in the art or reasonably conveyed to one of ordinary skill in the art by way of the context provided herein can be implemented as part of a disclosed method within the scope of the present disclosure. Moreover, some steps illustrated as part of one process can be implemented for another process where suitable; other steps of one or more processes can be added or substituted in other processes disclosed herein within the scope of the present disclosure. Additionally, it should be further appreciated that the methods disclosed throughout this specification are capable of being stored on an article of manufacture to facilitate transporting and transferring such methods to an electronic device, stored in embedded memory within the electronic device, and so forth. The term article of manufacture, as used, is intended to encompass a computer program accessible from any computer-readable device, device in conjunction with a carrier, or storage medium, or the like.

Referring now to FIG. 8, there is disclosed a flowchart of an example method 800 for generating data, according to additional embodiments of the present disclosure. At 802, method 800 can comprise initiating a PUF program process for a transistor device (or a group of transistor devices). At 804, method 800 can comprise applying a common voltage across a gate-source junction and a gate-drain junction of the transistor device. At 806, method 800 can comprise inducing a conductive electrical breakdown in a gate insulator material of the transistor device, and at 808 method 800 can comprise stopping applying the common voltage across the gate-source junction and the gate-drain junction of the transistor device.

At 810, method 800 can comprise reading a gate-source current of the transistor device or a gate-drain current of the transistor device. In some embodiments, method 800 can read either the gate-source current or the gate-drain current, or both the gate-source current and the gate-drain current. At 810, method 800 can comprise analyzing a current value of the gate-source current or of the gate-drain current of the transistor (or of both the gate-source current and of the gate-drain current). At 812, method 800 can comprise determining a value of a data bit for the transistor device in response to analyzing the current value.

In an embodiment(s), analyzing the current value can further comprise comparing the gate-source current or the gate drain current (or both) to one or more threshold current values associated with distinguishing an electrical breakdown of the gate-source junction from an electrical breakdown of the gate-drain junction. In another embodiment, determining the value of the data bit further comprises determining a first data value for the data bit in response to the gate-source current exceeding the one or more current threshold values, and determining a second data value for the data bit in response to the gate-source current not exceeding the one or more current threshold values. Alternatively, determining the value of the data bit can further comprise determining the first data value for the data bit in response to the gate-drain current exceeding the one or more current threshold values and determining the second data value for the data bit in response to the gate-drain current not exceeding the one or more current threshold values.

According to further embodiments, method 800 can comprise reading a first current value of the gate-source current and reading a second current value of the gate-drain current, wherein analyzing the current value of the gate-source current or of the gate-drain current further comprises comparing the first current value to the second current value. Moreover, determining the value of the data bit can further comprise either determining a first data value for the data bit in response to the first current value exceeding the second current value or determining a second data value for the data bit in response to the second current value exceeding the first current value. In yet another embodiment, determining the value of the data but can further comprise determining a first value for the data bit in response to measuring the first current value to be at least thirty percent larger than the second current value, or determining a second value for the data bit in response to measuring the second current value to be at least thirty percent larger than the first current value. Still further, method 800 can comprise determining an invalid value for the data bit in response to measuring the first current value to be larger than the second current value by less than thirty percent or in response to measuring the second current value to be larger than the first current value by less than thirty percent.

In various embodiments, the value of the data bit determined by method 800 can form an output of a physical unclonable function (PUF) implemented by executing the method on the transistor device. In various embodiments, the value of the data bit can be read or re-read (e.g., by repeating steps 810 and 812, supra) following its generation depending on application. For instance, the value of the data bit can be re-read to confirm a unique ID of a device, to retrieve a random number, retrieve a (portion) of a cryptographic key, and so forth. In at least one embodiment, method 800 can comprise selecting the common voltage to have a magnitude within a range of about 3 volts and about 5 volts, or a suitable value or range therebetween. In another embodiment, method 800 can further comprise applying a substrate voltage to a channel region of the transistor device having a second magnitude in a range of about 0.5 volts and about 2.5 volts.

In one or more additional embodiments of the present disclosure, method 800 can further comprise employing current compliance at a gate node or at the source node and the drain node in conjunction with applying the common voltage. The current compliance can be configured to limit a magnitude of current across the gate-source junction and the gate-drain junction in response to inducing the conductive electrical breakdown in the gate insulator material. In at least one such embodiment, method 800 can further comprise measuring the magnitude of the current across the gate-source junction or the gate-drain junction concurrent with applying the common voltage, wherein stopping applying the common voltage is in response to a measured value of the current exceeding a threshold breakdown current value.

FIG. 9 discloses a flowchart of an example method 900 according to further embodiments of the present disclosure. At 902, method 900 can comprise initiating a PUF program process for a transistor device. At 904, method 900 can further comprise applying a common voltage at a source node and a drain node of the transistor device. Further, at 906 method 900 can comprise applying a substrate voltage to a substrate region of the transistor device. At 908 method 900 can comprise applying a gate voltage to a gate node of the transistor device causing a potential difference from gate to source and gate to drain of the transistor device and also resulting in a second potential difference from gate to substrate that is lower in magnitude than the potential difference from gate to source and gate to drain. At 910 method 900 can comprise inducing an electrical breakdown across a gate insulator of the transistor.

At 912, method 900 can comprise measuring a gate-drain current and a gate-source current for the transistor device. At 914, a determination is made and method 900 can comprise determining whether a gate-source current or a gate-drain current is larger. If the gate-source current is larger, method 900 can proceed to 916 and assign a first digital value to the transistor device for the PUF program process. If the source-drain current is larger, method 900 can proceed to 918 and assign a second digital value to the transistor device for the PUF program process. At 920, method 900 can optionally comprise outputting the digital value in response to the PUF program process.

Referring to FIG. 10, a method 1000 for implementing a PUF for generating a PUF data sequence is disclosed. At 1002, method 1000 can comprise initiating a PUF program process to generate a PUF data sequence. At 1004, method 1000 can comprise determining a number of bits of the PUF data sequence, and selecting a number of transistors of an integrated circuit device equal to a number of bits in the PUF data sequence. At 1006 method 1000 can comprise applying a common breakdown voltage across a gate-source junction and a gate-drain junction of a transistor of the number of transistors. At 1008, method 1000 can comprise inducing a conductive breakdown in a gate insulator of the transistor and in respective gate insulators of each of the number of transistors, and at 1010 method 1000 can comprise reading a gate-source current or a gate-drain current of the transistor following the common breakdown voltage. In addition to the foregoing, at 1012, method 1000 can comprise referencing rules defining a PUF bit value based on gate-drain current or gate-source current, and analyzing the gate-source current or the gate-drain current with respect to the rules defining the PUF bit value.

At 1014, method 1000 can comprise determining a PUF bit value for each transistor of the number of transistors based on respective gate-drain or gate-source currents thereof. At 1016, method 1000 can comprise aggregating the determined PUF bit values into a PUF data sequence, and at 1018 method 1000 can optionally comprise outputting the data sequence in response to the PUF program process.

In one or more embodiments, method 1000 can comprise applying a substrate voltage, smaller in magnitude and of a same polarity as the common breakdown voltage, to a channel region of the transistor concurrent with applying the common breakdown voltage across the gate-source junction and the gate-drain junction of the transistor. In an embodiment, the common breakdown voltage can be in a first range from about 3 volts to about 5 volts (or any suitable value or range therebetween) and the substrate voltage can be in a second range from about 1 volt to about 3 volts (or any suitable value or range therebetween).

In further embodiments, the transistors can be metal oxide semiconductor field effect (MOSFET) transistors. The MOSFET transistors can have a metal oxide material or a semiconductor oxide material for the gate insulator, examples of which can be a silicon dioxide material or a hafnium oxide material.

In one or more additional embodiments, method 1000 can additionally comprise connecting a current compliance circuit to the transistor(s) in conjunction with applying the common breakdown voltage, wherein the current compliance circuit is configured to limit current through the gate-source junction and the gate-drain junction to a maximum current magnitude in response to inducing the conductive breakdown in the gate insulator.

In a further embodiment, analyzing the gate-source current or the gate-drain current further comprises comparing the gate-source current or the gate-drain current to a current threshold associated with conductive breakdown of the gate insulator. Method 1000 can further comprise determining a first bit value for the PUF bit in response to the gate-source current or the gate-drain current exceeding the current threshold, and determining a second bit value for the PUF bit in response to the gate-source current or the gate-drain current not exceeding the current threshold.

In yet another embodiment, analyzing the gate-source current or the gate-drain current further comprises comparing the gate-source current to the gate-drain current and determining a first bit value for the PUF bit in response to the gate-source current exceeding the gate-drain current, optionally by a predetermined value or percentage, and determining a second bit value for the PUF bit in response to the gate-drain current exceeding the gate-source current, optionally by the predetermined value or percentage.

Example Operating Environments

Figure 11:
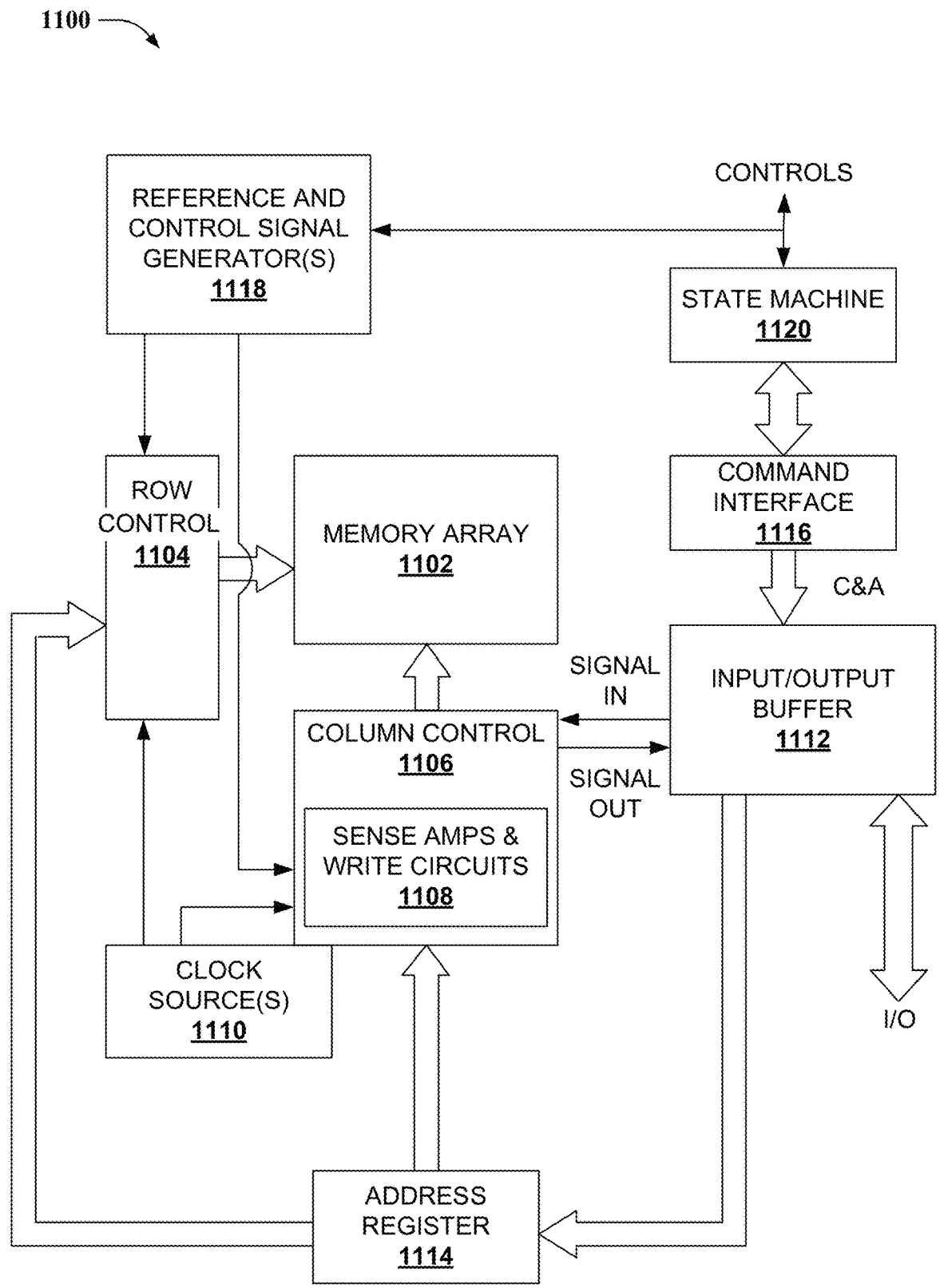
FIG. 11 illustrates a block diagram of an example electronic operating environment in accordance with one or more disclosed embodiments.

FIG. 11 illustrates a block diagram of an example operating and control environment 1100 for a memory array 1102 of a memory device according to aspects of the subject disclosure. Control environment 1100 and memory array 1102 can be formed within a single semiconductor die in some embodiments, although the subject disclosure is not so limited and in other embodiments some components of control environment 1100 can be formed on a separate semiconductor die. In at least one aspect of the subject disclosure, memory array 1102 can comprise memory selected from a variety of memory cell technologies. In at least one embodiment, memory array 1102 can comprise a gate insulated transistor device, arranged in a compact two or three-dimensional architecture.

A column controller 1106 including, sense amps and write circuits 1108 can be formed adjacent to memory array 1102. Moreover, column controller 1106 can be configured to activate (or identify for activation) a subset of bit lines of memory array 1102. Column controller 1106 can utilize a control signal(s) provided by a reference and control signal generator(s) 1118 to activate, as well as operate upon, respective ones of the subset of bitlines, applying suitable program, erase or read voltages to those bitlines. Non-activated bitlines can be kept at an inhibit voltage (also applied by reference and control signal generator(s) 1118), to mitigate or avoid bit-disturb effects on these non-activated bitlines.

In addition, operating and control environment 1100 can comprise a row controller 1104. Row controller 1104 can be formed adjacent to and electrically connected with word lines of memory array 1102. Also utilizing control signals of reference and control signal generator(s) 1118, row controller 1104 can select one or more rows of memory cells with a suitable selection voltage. Moreover, row controller 1104 can facilitate program, erase or read operations by applying suitable voltages at selected word lines.

Sense amps and write circuits 1108 can read data from and write data to (respectively), the activated memory cells of memory array 1102, which are selected by column control 1106 and row control 1104. Data read out from memory array 1102 can be provided to an input/output buffer 1112. Likewise, data to be written to memory array 1102 can be received from the input/output buffer 1112 and written to the activated memory cells of memory array 1102.

A clock source(s) 1110 can provide respective clock pulses to facilitate timing for read, write, and program operations of row controller 1104 and column controller 1106. Clock source(s) 1110 can further facilitate selection of word lines or bit lines in response to external or internal commands received by operating and control environment 1100. Input/output buffer 1112 can comprise a command and address input, as well as a bidirectional data input and output. Instructions are provided over the command and address input, and the data to be written to memory array 1102 as well as data read from memory array 1102 is conveyed on the bidirectional data input and output, facilitating connection to an external host apparatus, such as a computer or other processing device (not depicted, but see e.g., computer 1202 of FIG. 12, infra).

Input/output buffer 1112 can be configured to receive write data, receive an erase instruction, receive a status or maintenance instruction, output readout data, output status information, and receive address data and command data, as well as address data for respective instructions. Address data can be transferred to row controller 1104 and column controller 1106 by an address register 1114. In addition, input data is transmitted to memory array 1102 via signal input lines between column control 1106 and input/output buffer 1112, and output data is received from memory array 1102 via sense amps (1108) and provided on signal output lines to input/output buffer 1112. Input data can be received from the host apparatus, and output data can be delivered to the host apparatus via the I/O bus.

Commands received from the host apparatus can be provided to a command interface 1116. Command interface 1116 can be configured to receive external control signals from the host apparatus and determine whether data input to the input/output buffer 1112 is write data, a command, or an address. Input commands can be transferred to a state machine 1120.

State machine 1120 can be configured to manage programming and reprogramming of memory array 1102 (as well as other memory banks of a multi-bank memory array). Instructions provided to state machine 1120 are implemented according to control logic configurations, enabling state machine 1120 to manage read, write, erase, data input, data output, and other functionality associated with memory cell array 1102. In some aspects, state machine 1120 can send and receive acknowledgments and negative acknowledgments regarding successful receipt or execution of various commands. In further embodiments, state machine 1120 can decode and implement status-related commands, decode and implement configuration commands, and so on.

To implement read, write, erase, input, output, etc., functionality, state machine 1120 can control clock source(s) 1110 or reference and control signal generator(s) 1118. Control of clock source(s) 1110 can cause output pulses configured to facilitate row controller 1104 and column controller 1106 implementing the particular functionality. Output pulses can be transferred to selected bit lines by column controller 1106, for instance, or word lines by row controller 1104, for instance.

Figure 12:
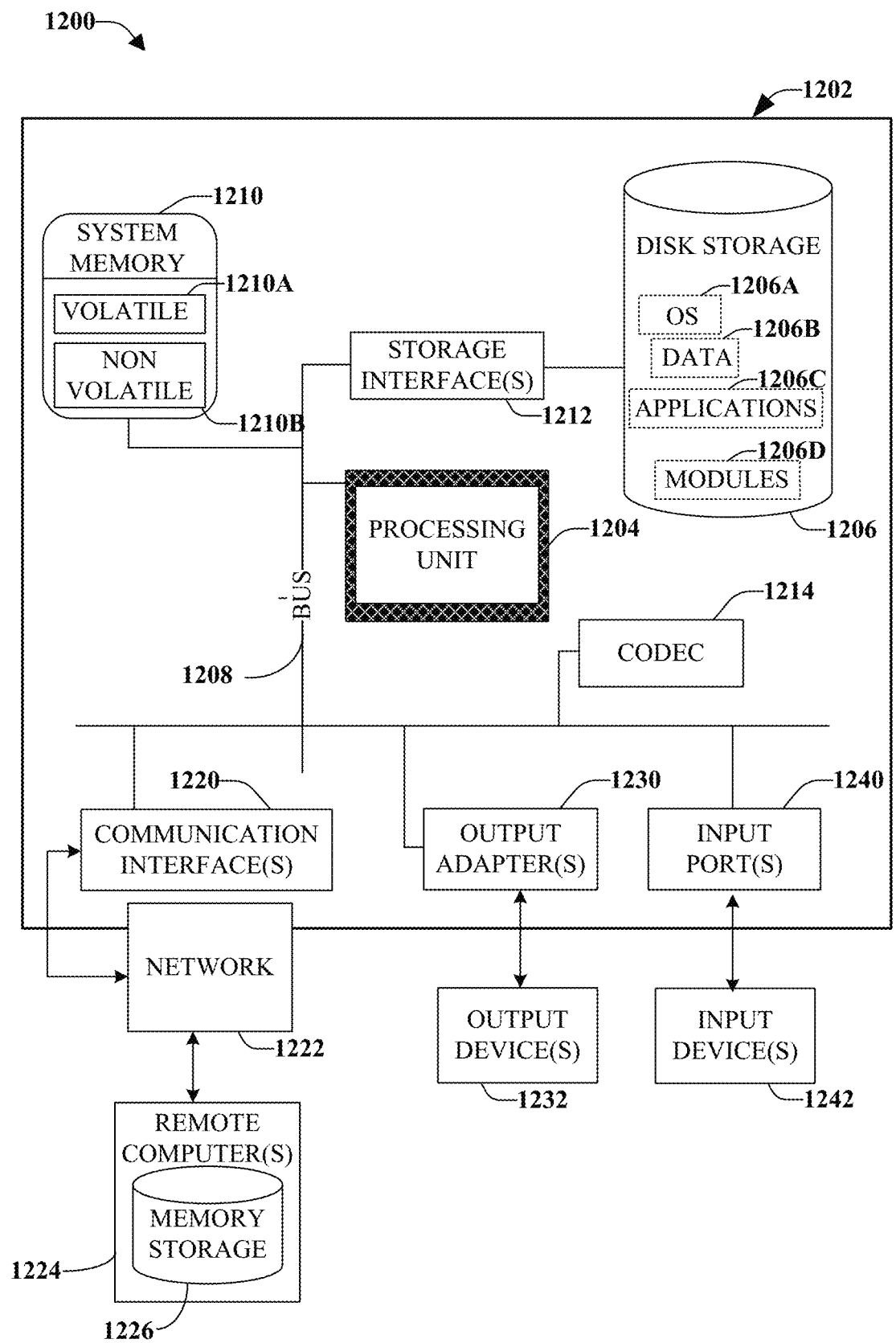
FIG. 12 illustrates a block diagram of an example computing environment for implementing one or more embodiments of the present disclosure.

In connection with FIG. 12, the systems, devices, and/or processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

With reference to FIG. 12, a suitable environment 1200 for implementing various aspects of the claimed subject matter includes a computer 1202. The computer 1202 includes a processing unit 1204, a system memory 1210, a codec 1214, and a system bus 1208. The system bus 1208 couples system components including, but not limited to, the system memory 1210 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1210 includes volatile memory 1210A and non-volatile memory 1210B. The basic input/output system (BIOS), containing the basic routines to transfer information between elements within the computer 1202, such as during start-up, is stored in non-volatile memory 1210B. In addition, according to present innovations, codec 1214 may include at least one of an encoder or decoder, wherein the at least one of an encoder or decoder may consist of hardware, software, or a combination of hardware and software. Although, codec 1214 is depicted as a separate component, codec 1214 may be contained within non-volatile memory 1210B. By way of illustration, and not limitation, non-volatile memory 1210B can include read only memory (ROM), programmable ROM (PROM), electrically programmable ROM (EPROM), electrically erasable programmable ROM (EEPROM), or flash memory, two-terminal memory, and so on. Volatile memory 1210A includes random access memory (RAM), and in some embodiments can embody a cache memory. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1202 may also include removable/non-removable, volatile/non-volatile computer storage medium. FIG. 12 illustrates, for example, disk storage 1206. Disk storage 1206 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1206 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1206 to the system bus 1208, a removable or non-removable interface is typically used, such as storage interface 1212. It is appreciated that storage devices 1206 can store information related to a user. Such information might be stored at or provided to a server or to an application running on a user device. In one embodiment, the user can be notified (e.g., by way of output device(s) 1232) of the types of information that are stored to disk storage 1206 or transmitted to the server or application. The user can be provided the opportunity to opt-in or opt-out of having such information collected and/or shared with the server or application (e.g., by way of input from input device(s) 1242))).

It is to be appreciated that FIG. 12 describes software that acts as an intermediary between users and the basic computer resources described in the suitable operating environment 1200. Such software includes an operating system 1206A. Operating system 1206A, which can be stored on disk storage 1206, acts to control and allocate resources of the computer system 1202. Applications 1206C take advantage of the management of resources by operating system 1206A through program modules 1206D, and program data 1206D, such as the boot/shutdown transaction table and the like, stored either in system memory 1210 or on disk storage 1206. It is to be appreciated that the claimed subject matter can be implemented with various operating systems or combinations of operating systems.

A user enters commands or information into the computer 1202 through input device(s) 1242. Input devices 1242 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via input port(s) 1240. Input port(s) 1240 include, for example, a serial port, a parallel port, a game port, and a universal serial bus (USB). Output device(s) 1232 use some of the same type of ports as input device(s) 1242. Thus, for example, a USB port may be used to provide input to computer 1202 and to output information from computer 1202 to an output device 1232. Output adapter 1230 is provided to illustrate that there are some output devices 1232 like monitors, speakers, and printers, among other output devices 1232, which require special adapters. The output adapters 1230 include, by way of illustration and not limitation, video and sound cards that provide a means of connection between the output device 1232 and the system bus 1208. It should be noted that other devices and/or systems of devices provide both input and output capabilities such as remote computer(s) 1238.

Computer 1202 can operate in a networked environment using logical connections to one or more remote computers, such as remote computer(s) 1224. The remote computer(s) 1224 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1226 is illustrated with remote computer(s) 1224. Remote computer(s) 1224 is logically connected to computer 1202 through a network 1222 and then connected via communication interface(s) 1220. Network 1222 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication interface(s) 1220 refers to the hardware/software employed to connect the network 1222 to the bus 1208. While communication interface(s) 1220 is shown for illustrative clarity inside computer 1202, it can also be external to computer 1202. The hardware/software necessary for connection to the network 1222 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

Moreover, it is to be appreciated that various components described herein can include electrical circuit(s) that can include components and circuitry elements of suitable value in order to implement the embodiments of the subject disclosure. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for generating data, comprising:
    apply a common voltage across a gate-source junction and a gate-drain junction of a transistor device;
    induce a conductive electrical breakdown in a gate insulator material of the transistor device;
    stop applying the common voltage across the gate-source junction and the gate-drain junction;
    read a gate-source current of the transistor device or a gate-drain current of the transistor device;
    analyze a current value of the gate-source current or of the gate-drain current of the transistor; and
    determine a value of a data bit for the transistor device in response to analyzing the current value.

2. The method of claim 1, wherein analyzing the current value further comprises: compare the gate-source current or the gate-drain current to one or more threshold current values associated with distinguishing an electrical breakdown of the gate-source junction from an electrical breakdown of the gate-drain junction.

3. The method of claim 2, wherein determining the value of the data bit further comprises one of:
    determine a first data value for the data bit in response to the gate-source current exceeding the one or more current threshold values and determine a second data value for the data bit in response to the gate-source current not exceeding the one or more current threshold values; or
    determine the first data value for the data bit in response to the gate-drain current exceeding the one or more current threshold values and determine the second data value for the data bit in response to the gate-drain current not exceeding the one or more current threshold values.

4. The method of claim 1, further comprising reading a first current value of the gate-source current and reading a second current value of the gate-drain current, wherein analyzing the current value of the gate-source current or of the gate-drain current further comprises:
    comparing the first current value to the second current value, and wherein determining the value of the data bit further comprises one of:
    determine a first data value for the data bit in response to the first current value exceeding the second current value; or
    determine a second data value for the data bit in response to the second current value exceeding the first current value.

5. The method of claim 4, wherein determining the value of the data bit further comprises one of:
    determining a first value for the data bit in response to measuring the first current value to be at least thirty percent larger than the second current value; or
    determining a second value for the data bit in response to measuring the second current value to be at least thirty percent larger than the first current value.

6. The method of claim 5, further comprising determining an invalid value for the data bit in response to measuring the first current value to be larger than the second current value by less than thirty percent or in response to measuring the second current value to be larger than the first current value by less than thirty percent.

7. The method of claim 1, wherein the data bit forms an output of a physical unclonable function (PUF) implemented by executing the method on the transistor device.

8. The method of claim 1, further comprising selecting the common voltage to have a magnitude within a range of about 3 volts and about 5 volts.

9. The method of claim 1, further comprising applying a substrate voltage to a channel region of the transistor device having a second magnitude in a range of about 0.5 volts and about 2.5 volts.

10. The method of claim 1, further comprising employing current compliance at the gate node or at the source node and the drain node in conjunction with applying the common voltage, wherein the current compliance is configured to limit a magnitude of current across the gate-source junction and the gate-drain junction in response to inducing the conductive electrical breakdown in the gate insulator material.

11. The method of claim 10, further comprising measuring the magnitude of current across the gate-source junction or the gate-drain junction concurrent with applying the common voltage, wherein stopping applying the common voltage is in response to a measured value of the current exceeding a threshold breakdown current value.

12. A method for implementing a physical unclonable function (PUF) for generating a PUF data sequence, comprising:
    determining a number of bits of the PUF data sequence;
    select a number of transistors of an integrated circuit device equal to the number of bits of the PUF data sequence;
    apply a common breakdown voltage across a gate-source junction and a gate-drain junction of a transistor of the number of transistors;
    induce a conductive breakdown in a gate insulator of the transistor;
    read a gate-source current or a gate-drain current of the transistor following the common breakdown voltage;
    analyze the gate-source current or the gate-drain current with respect to a digitization standard; and
    determine a bit value of one PUF bit of the PUF data sequence from the gate-source current or the gate-drain current of the transistor.

13. The method of claim 12, further comprising applying the common breakdown voltage to each of the transistors of the number of transistors and inducing the conductive breakdown in respective gate insulators of each of the transistors.

14. The method of claim 13, further comprising reading gate-source current or drain-source current for each of the transistors and determining respective bit values of the PUF data sequence.

15. The method of claim 12, further comprising applying a substrate voltage, smaller in magnitude and of a same polarity as the common breakdown voltage, to a channel region of the transistor concurrent with or previous to applying the common breakdown voltage across the gate-source junction and the gate-drain junction of the transistor.

16. The method of claim 15, wherein the common breakdown voltage is in a first range from about 3 volts to about 5 volts and the substrate voltage is in a second range from about 1 volt to about 3 volts.

17. The method of claim 12, wherein the transistors are metal oxide semiconductor field effect transistors having a metal oxide material or semiconductor oxide material for the gate insulator.

18. The method of claim 12, further comprising connecting a current compliance circuit to the transistor in conjunction with applying the common breakdown voltage, wherein the current compliance circuit is configured to limit current through the gate-source junction and the gate-drain junction to a maximum current magnitude in response to inducing the conductive breakdown in the gate insulator.

19. The method of claim 12, wherein analyzing the gate-source current or the gate-drain current further comprises comparing the gate-source current or the gate-drain current to a current threshold associated with conductive breakdown of the gate insulator and determining a first bit value for the PUF bit in response to the gate-source current or the gate-drain current exceeding the current threshold, and determining a second bit value for the PUF bit in response to the gate-source current or the gate-drain current not exceeding the current threshold.

20. The method of claim 12, wherein analyzing the gate-source current or the gate-drain current further comprises comparing the gate-source current to the gate-drain current and determining a first bit value for the PUF bit in response to the gate-source current exceeding the gate-drain current, optionally by a predetermined value or percentage, and determining a second bit value for the PUF bit in response to the gate-drain current exceeding the gate-source current, optionally by the predetermined value or percentage.

\* \* \* \* \*